United States Patent
Jerding et al.

(10) Patent No.: US 9,380,347 B2
(45) Date of Patent: Jun. 28, 2016

(54) HYPERTEXT SERVICE GUIDE MENU DISPLAY

(71) Applicant: Cisco Technology, Inc., San Jose, CA (US)

(72) Inventors: Dean F. Jerding, Roswell, GA (US); Arturo A. Rodriguez, Norcross, GA (US); Robert O. Banker, Cumming, GA (US); John M. Schlarb, Alpharetta, GA (US); Robert T. Van Orden, Norcross, GA (US); Bindu Crandall, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/287,339

(22) Filed: May 27, 2014

(65) Prior Publication Data

US 2014/0282732 A1 Sep. 18, 2014

Related U.S. Application Data

(60) Continuation of application No. 13/596,689, filed on Aug. 28, 2012, now Pat. No. 8,739,212, which is a continuation of application No. 10/957,849, filed on Oct. 4, 2004, now Pat. No. 8,255,951, which is a division of application No. 09/565,931, filed on May 4, 2000, now Pat. No. 7,934,232.

(51) Int. Cl.
*H04N 5/445* (2011.01)
*H04N 21/482* (2011.01)
(Continued)

(52) U.S. Cl.
CPC ......... *H04N 21/482* (2013.01); *H04N 5/44543* (2013.01); *H04N 21/4622* (2013.01); *H04N 21/4782* (2013.01); *H04N 21/8586* (2013.01); *H04N 21/4856* (2013.01)

(58) Field of Classification Search
USPC .......................................... 725/40, 39, 44, 46
See application file for complete search history.

(56) References Cited

U.S. PATENT DOCUMENTS 3,676,580 A 7/1972 Beck
4,528,643 A 7/1985 Freeny
(Continued)

FOREIGN PATENT DOCUMENTS

CA 2 363 052 A1 11/1995
CA 2 223 025 C 11/2001
(Continued)

OTHER PUBLICATIONS

U.S. Office Action mailed Jun. 27, 2014 in U.S. Appl. No. 13/482,689, 25 pgs.
(Continued)

*Primary Examiner* — Nicholas Corbo
(74) *Attorney, Agent, or Firm* — Merchant & Gould P.C.

(57) ABSTRACT

The present invention provides a method and system for accessing services in a television system. In one implementation, a DHCT presents a user a menu containing a plurality of selectable link representations corresponding to separate services or applications offered by the cable television system. The user navigates the menu with a remote device and selects a desired service by choosing the selectable link representation corresponding to the desired service or application. The DHCT receives the user input, translates the selectable link command into an executable call, and activates the service or application corresponding to the selected link representation from the menu chosen by the user.

16 Claims, 10 Drawing Sheets

(51) Int. Cl.
*H04N 21/462* (2011.01)
*H04N 21/4782* (2011.01)
*H04N 21/858* (2011.01)
*H04N 21/485* (2011.01)

(56) References Cited

U.S. PATENT DOCUMENTS

| | | |
|---|---|---|
| 4,586,158 A | 4/1986 | Brandle |
| 4,706,121 A | 11/1987 | Young |
| 4,751,578 A | 6/1988 | Reiter et al. |
| 4,821,097 A | 4/1989 | Robbins |
| 4,827,250 A | 5/1989 | Stallkamp |
| 4,885,775 A | 12/1989 | Lucas |
| 4,908,713 A | 3/1990 | Levine |
| 4,930,158 A | 5/1990 | Vogel |
| 4,949,187 A | 8/1990 | Cohen |
| 4,963,994 A | 10/1990 | Levine |
| 4,984,152 A | 1/1991 | Mueller |
| 4,991,011 A | 2/1991 | Johnson et al. |
| 5,038,211 A | 8/1991 | Hallenbeck |
| 5,172,413 A | 12/1992 | Bradley et al. |
| 5,191,410 A | 3/1993 | McCalley et al. |
| 5,253,066 A | 10/1993 | Vogel |
| 5,291,554 A | 3/1994 | Morales |
| 5,293,357 A | 3/1994 | Hallenbeck |
| 5,317,391 A | 5/1994 | Banker et al. |
| 5,329,590 A | 7/1994 | Pond |
| 5,353,121 A | 10/1994 | Young et al. |
| 5,357,276 A | 10/1994 | Banker et al. |
| 5,359,362 A | 10/1994 | Lewis et al. |
| 5,371,551 A | 12/1994 | Logan et al. |
| 5,398,071 A | 3/1995 | Gove et al. |
| 5,410,326 A | 4/1995 | Goldstein |
| 5,410,343 A | 4/1995 | Coddington et al. |
| 5,410,344 A | 4/1995 | Graves et al. |
| 5,414,455 A | 5/1995 | Hooper et al. |
| 5,418,622 A | 5/1995 | Takeuchi |
| 5,448,313 A | 9/1995 | Kim et al. |
| 5,461,427 A | 10/1995 | Duffield et al. |
| 5,465,120 A | 11/1995 | Schultheiss |
| 5,477,262 A | 12/1995 | Banker et al. |
| 5,479,268 A | 12/1995 | Young et al. |
| 5,481,542 A | 1/1996 | Logston et al. |
| 5,483,277 A | 1/1996 | Granger |
| 5,483,278 A | 1/1996 | Strubbe et al. |
| 5,485,216 A | 1/1996 | Lee |
| 5,493,638 A | 2/1996 | Hooper et al. |
| 5,508,815 A | 4/1996 | Levine |
| 5,512,958 A | 4/1996 | Rzeszewski |
| 5,515,495 A | 5/1996 | Ikemoto |
| 5,521,631 A | 5/1996 | Budow et al. |
| 5,524,195 A | 6/1996 | Clanton et al. |
| 5,530,754 A | 6/1996 | Garfinkle |
| 5,532,735 A | 7/1996 | Blahut et al. |
| 5,532,754 A | 7/1996 | Young et al. |
| 5,544,354 A | 8/1996 | May et al. |
| 5,555,441 A | 9/1996 | Haddad |
| 5,557,541 A | 9/1996 | Schulhof et al. |
| 5,562,732 A | 10/1996 | Eisenberg |
| 5,565,908 A | 10/1996 | Ahmad |
| 5,568,181 A | 10/1996 | Greenwood et al. |
| 5,568,272 A | 10/1996 | Levine |
| 5,568,785 A | 10/1996 | Hazen |
| 5,579,055 A | 11/1996 | Hamilton et al. |
| 5,583,560 A | 12/1996 | Florin et al. |
| 5,583,995 A | 12/1996 | Gardner et al. |
| 5,585,821 A | 12/1996 | Ishikura et al. |
| 5,585,838 A | 12/1996 | Lawler et al. |
| 5,589,892 A | 12/1996 | Knee et al. |
| 5,592,551 A | 1/1997 | Lett et al. |
| 5,594,509 A | 1/1997 | Florin et al. |
| 5,598,524 A | 1/1997 | Johnston, Jr. et al. |
| 5,600,364 A | 2/1997 | Hendricks et al. |
| 5,600,573 A | 2/1997 | Hendricks et al. |
| 5,604,528 A | 2/1997 | Edwards et al. |
| 5,614,940 A | 3/1997 | Cobbley et al. |
| 5,619,247 A | 4/1997 | Russo |
| 5,619,249 A | 4/1997 | Billock et al. |
| 5,621,456 A | 4/1997 | Florin et al. |
| 5,623,613 A | 4/1997 | Rowe et al. |
| 5,625,405 A | 4/1997 | DuLac et al. |
| 5,625,864 A | 4/1997 | Budow et al. |
| 5,629,732 A | 5/1997 | Moskowitz et al. |
| 5,629,733 A | 5/1997 | Youman et al. |
| 5,631,693 A | 5/1997 | Wunderlich et al. |
| 5,632,681 A | 5/1997 | Bakoglu et al. |
| 5,635,979 A | 6/1997 | Kostreski et al. |
| 5,635,980 A | 6/1997 | Lin et al. |
| 5,635,989 A | 6/1997 | Rothmuller |
| 5,650,831 A | 7/1997 | Farwell |
| 5,654,747 A | 8/1997 | Ottesen et al. |
| 5,659,350 A | 8/1997 | Hendricks et al. |
| 5,664,133 A | 9/1997 | Malamud |
| 5,666,293 A | 9/1997 | Metz et al. |
| 5,671,411 A | 9/1997 | Watts et al. |
| 5,675,752 A | 10/1997 | Scott et al. |
| 5,677,905 A | 10/1997 | Bigham et al. |
| 5,682,206 A | 10/1997 | Wehmeyer et al. |
| 5,682,597 A | 10/1997 | Ganek et al. |
| 5,684,918 A | 11/1997 | Abecassis |
| 5,686,954 A | 11/1997 | Yoshinobu et al. |
| 5,687,331 A | 11/1997 | Volk et al. |
| 5,689,641 A | 11/1997 | Ludwig et al. |
| 5,694,163 A | 12/1997 | Harrison |
| 5,694,176 A | 12/1997 | Bruette et al. |
| 5,694,546 A | 12/1997 | Reisman |
| 5,696,905 A | 12/1997 | Reimer et al. |
| 5,696,906 A | 12/1997 | Peters et al. |
| 5,699,107 A | 12/1997 | Lawler et al. |
| 5,710,591 A | 1/1998 | Bruno et al. |
| 5,715,169 A | 2/1998 | Noguchi |
| 5,715,515 A | 2/1998 | Akins, III et al. |
| 5,717,468 A | 2/1998 | Baryla |
| 5,721,827 A | 2/1998 | Logan et al. |
| 5,721,829 A | 2/1998 | Dunn et al. |
| 5,721,897 A | 2/1998 | Rubinstein |
| 5,724,106 A | 3/1998 | Autry et al. |
| 5,724,521 A | 3/1998 | Dedrick |
| 5,724,646 A | 3/1998 | Ganek et al. |
| 5,727,060 A | 3/1998 | Young |
| 5,729,549 A | 3/1998 | Kostreski et al. |
| 5,732,216 A | 3/1998 | Logan et al. |
| 5,734,853 A | 3/1998 | Hendricks et al. |
| 5,737,028 A | 4/1998 | Bertram et al. |
| 5,740,304 A | 4/1998 | Katsuyama et al. |
| 5,740,549 A | 4/1998 | Reilly et al. |
| 5,745,837 A | 4/1998 | Fuhrmann |
| 5,748,493 A | 5/1998 | Lightfoot et al. |
| 5,751,282 A | 5/1998 | Girard et al. |
| 5,752,160 A | 5/1998 | Dunn |
| 5,754,773 A | 5/1998 | Ozden et al. |
| 5,758,257 A | 5/1998 | Herz et al. |
| 5,764,873 A | 6/1998 | Magid et al. |
| 5,764,899 A | 6/1998 | Eggleston et al. |
| 5,771,435 A | 6/1998 | Brown |
| 5,774,170 A | 6/1998 | Hite et al. |
| 5,778,077 A | 7/1998 | Davidson |
| 5,790,170 A | 8/1998 | Suzuki |
| 5,790,176 A | 8/1998 | Craig |
| 5,790,935 A | 8/1998 | Payton |
| 5,790,940 A | 8/1998 | Laborde et al. |
| 5,796,828 A | 8/1998 | Tsukamoto et al. |
| 5,798,785 A | 8/1998 | Hendricks et al. |
| 5,799,063 A | 8/1998 | Krane |
| 5,801,747 A | 9/1998 | Bedard |
| 5,801,787 A | 9/1998 | Schein et al. |
| 5,802,502 A | 9/1998 | Gell et al. |
| 5,808,608 A | 9/1998 | Young et al. |
| 5,808,611 A | 9/1998 | Johnson et al. |
| 5,809,204 A | 9/1998 | Young et al. |
| 5,812,123 A | 9/1998 | Rowe et al. |
| 5,812,124 A | 9/1998 | Eick et al. |
| 5,812,786 A | 9/1998 | Seazholtz et al. |
| 5,822,123 A | 10/1998 | Davis et al. |

(56) References Cited

U.S. PATENT DOCUMENTS

| | | |
|---|---|---|
| 5,826,102 A | 10/1998 | Escobar et al. |
| 5,826,110 A | 10/1998 | Ozden et al. |
| 5,828,419 A | 10/1998 | Bruette et al. |
| 5,828,845 A | 10/1998 | Jagadish et al. |
| 5,835,843 A | 11/1998 | Haddad |
| 5,838,314 A | 11/1998 | Neel et al. |
| 5,844,620 A | 12/1998 | Coleman et al. |
| 5,848,352 A | 12/1998 | Dougherty et al. |
| 5,850,218 A | 12/1998 | LaJoie et al. |
| 5,856,975 A | 1/1999 | Rostoker et al. |
| 5,859,641 A | 1/1999 | Cave |
| 5,861,881 A | 1/1999 | Freeman et al. |
| 5,861,906 A | 1/1999 | Dunn et al. |
| 5,877,755 A | 3/1999 | Hallhake |
| 5,877,756 A | 3/1999 | Um |
| 5,880,768 A | 3/1999 | Lemmons et al. |
| 5,886,690 A | 3/1999 | Pond et al. |
| 5,886,732 A | 3/1999 | Humpleman |
| 5,895,454 A | 4/1999 | Harrington |
| 5,898,456 A | 4/1999 | Wahl |
| 5,900,905 A | 5/1999 | Shoff et al. |
| 5,905,522 A | 5/1999 | Lawler |
| 5,905,865 A | 5/1999 | Palmer et al. |
| 5,905,942 A | 5/1999 | Stoel et al. |
| 5,907,323 A | 5/1999 | Lawler et al. |
| 5,913,040 A | 6/1999 | Rakavy et al. |
| 5,914,712 A | 6/1999 | Sartain et al. |
| 5,914,746 A | 6/1999 | Matthews, III et al. |
| 5,915,068 A | 6/1999 | Levine |
| 5,917,822 A | 6/1999 | Lyles et al. |
| 5,929,849 A | 7/1999 | Kikinis |
| 5,930,493 A | 7/1999 | Ottesen et al. |
| 5,935,206 A | 8/1999 | Dixon et al. |
| 5,936,659 A | 8/1999 | Viswanathan |
| 5,940,073 A | 8/1999 | Klosterman et al. |
| 5,943,047 A | 8/1999 | Suzuki |
| 5,956,024 A | 9/1999 | Strickland et al. |
| 5,956,716 A | 9/1999 | Kenner et al. |
| 5,960,411 A | 9/1999 | Hartman et al. |
| 5,961,603 A | 10/1999 | Kunkel et al. |
| 5,969,748 A | 10/1999 | Casement et al. |
| 5,973,685 A | 10/1999 | Schaffa et al. |
| 5,978,043 A | 11/1999 | Blonstein et al. |
| 5,978,381 A | 11/1999 | Perlman et al. |
| 5,983,273 A | 11/1999 | White et al. |
| 5,986,650 A | 11/1999 | Ellis et al. |
| 5,987,256 A | 11/1999 | Wu et al. |
| 5,990,881 A | 11/1999 | Inoue et al. |
| 5,990,890 A | 11/1999 | Etheredge |
| 5,990,927 A | 11/1999 | Hendricks et al. |
| 5,995,134 A | 11/1999 | Hayashi |
| 5,996,015 A | 11/1999 | Day et al. |
| 6,002,401 A | 12/1999 | Baker |
| 6,005,565 A | 12/1999 | Legall et al. |
| 6,005,631 A | 12/1999 | Anderson et al. |
| 6,006,257 A | 12/1999 | Slezak |
| 6,008,803 A | 12/1999 | Rowe et al. |
| 6,008,836 A | 12/1999 | Bruck et al. |
| 6,014,184 A | 1/2000 | Knee et al. |
| 6,014,694 A | 1/2000 | Aharoni et al. |
| 6,014,727 A | 1/2000 | Creemer |
| 6,016,348 A | 1/2000 | Blatter et al. |
| 6,018,359 A | 1/2000 | Kermode |
| 6,018,372 A | 1/2000 | Etheredge |
| 6,020,912 A | 2/2000 | De Lang |
| 6,023,267 A | 2/2000 | Chapuis et al. |
| 6,025,837 A | 2/2000 | Matthews, III et al. |
| 6,025,868 A | 2/2000 | Russo |
| 6,025,869 A | 2/2000 | Stas et al. |
| 6,026,376 A | 2/2000 | Kenney |
| 6,034,677 A | 3/2000 | Noguchi et al. |
| 6,035,281 A | 3/2000 | Crosskey et al. |
| 6,037,933 A | 3/2000 | Blonstein et al. |
| 6,049,831 A | 4/2000 | Gardell et al. |
| 6,055,571 A | 4/2000 | Fulp et al. |
| 6,057,872 A | 5/2000 | Candelore |
| 6,061,097 A | 5/2000 | Satterfield |
| 6,064,380 A | 5/2000 | Swenson et al. |
| 6,064,980 A | 5/2000 | Jacobi et al. |
| 6,070,186 A | 5/2000 | Nishio |
| 6,072,982 A | 6/2000 | Haddad |
| 6,073,105 A | 6/2000 | Sutcliffe et al. |
| 6,075,575 A | 6/2000 | Schein et al. |
| 6,081,263 A | 6/2000 | LeGall et al. |
| 6,081,830 A | 6/2000 | Schindler |
| 6,085,185 A | 7/2000 | Matsuzawa et al. |
| 6,088,455 A | 7/2000 | Logan |
| 6,094,680 A | 7/2000 | Hokanson |
| 6,097,383 A | 8/2000 | Gaughan et al. |
| 6,098,082 A | 8/2000 | Gibbon et al. |
| 6,100,883 A | 8/2000 | Hoarty |
| 6,101,512 A | 8/2000 | DeRose et al. |
| 6,108,002 A | 8/2000 | Ishizaki |
| 6,108,042 A | 8/2000 | Adams et al. |
| 6,108,706 A | 8/2000 | Birdwell et al. |
| 6,118,445 A | 9/2000 | Nonomura et al. |
| 6,118,498 A | 9/2000 | Reitmeier |
| 6,118,976 A | 9/2000 | Arias et al. |
| 6,119,163 A | 9/2000 | Monteiro et al. |
| 6,124,878 A | 9/2000 | Adams et al. |
| 6,125,259 A | 9/2000 | Perlman |
| 6,130,726 A | 10/2000 | Darbee et al. |
| 6,133,909 A | 10/2000 | Schein et al. |
| 6,134,572 A | 10/2000 | Wolf et al. |
| 6,137,539 A | 10/2000 | Lownes et al. |
| 6,138,139 A | 10/2000 | Beck et al. |
| 6,141,003 A | 10/2000 | Chor et al. |
| 6,141,488 A | 10/2000 | Knudson et al. |
| 6,145,083 A | 11/2000 | Shaffer et al. |
| 6,148,332 A | 11/2000 | Brewer et al. |
| 6,151,059 A | 11/2000 | Schein et al. |
| 6,151,688 A | 11/2000 | Wipfel et al. |
| 6,157,377 A | 12/2000 | Shah-Nazaroff et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,989 A | 12/2000 | Hendricks et al. |
| 6,163,272 A | 12/2000 | Goode et al. |
| 6,166,730 A | 12/2000 | Goode et al. |
| 6,166,778 A * | 12/2000 | Yamamoto et al. ........... 348/569 |
| 6,169,543 B1 * | 1/2001 | Wehmeyer ...................... 725/47 |
| 6,172,674 B1 | 1/2001 | Etheredge |
| 6,172,677 B1 | 1/2001 | Stautner et al. |
| 6,177,931 B1 | 1/2001 | Alexander et al. |
| 6,181,333 B1 | 1/2001 | Chaney et al. |
| 6,181,693 B1 | 1/2001 | Maresca |
| 6,182,287 B1 | 1/2001 | Schneidewend et al. |
| 6,184,877 B1 | 2/2001 | Dodson et al. |
| 6,188,684 B1 | 2/2001 | Setoyama et al. |
| 6,195,689 B1 | 2/2001 | Bahlmann |
| 6,201,536 B1 | 3/2001 | Hendricks et al. |
| 6,201,540 B1 | 3/2001 | Gallup et al. |
| 6,205,485 B1 | 3/2001 | Kikinis |
| 6,208,335 B1 | 3/2001 | Gordon et al. |
| 6,209,130 B1 | 3/2001 | Rector et al. |
| 6,216,264 B1 | 4/2001 | Maze et al. |
| 6,233,390 B1 | 5/2001 | Yoneda |
| 6,238,290 B1 | 5/2001 | Tarr et al. |
| 6,239,794 B1 | 5/2001 | Yuen et al. |
| 6,239,845 B1 | 5/2001 | Itagaki et al. |
| 6,240,555 B1 | 5/2001 | Shoff et al. |
| 6,243,142 B1 | 6/2001 | Mugura et al. |
| 6,249,532 B1 | 6/2001 | Yoshikawa et al. |
| 6,253,375 B1 | 6/2001 | Gordon et al. |
| 6,259,733 B1 | 7/2001 | Kaye et al. |
| 6,263,501 B1 | 7/2001 | Schein et al. |
| 6,266,814 B1 | 7/2001 | Lemmons et al. |
| 6,268,849 B1 | 7/2001 | Boyer et al. |
| 6,272,484 B1 | 8/2001 | Martin et al. |
| 6,275,268 B1 | 8/2001 | Ellis et al. |
| 6,275,506 B1 | 8/2001 | Fazel et al. |
| 6,275,648 B1 | 8/2001 | Knudson et al. |
| 6,282,713 B1 | 8/2001 | Kitsukawa et al. |
| 6,289,346 B1 | 9/2001 | Milewski et al. |

(56) References Cited

U.S. PATENT DOCUMENTS

| | | |
|---|---|---|
| 6,289,514 B1 | 9/2001 | Link et al. |
| 6,292,624 B1 | 9/2001 | Saib et al. |
| 6,305,019 B1 | 10/2001 | Dyer et al. |
| 6,305,020 B1 | 10/2001 | Hoarty et al. |
| 6,311,011 B1 | 10/2001 | Kuroda |
| 6,314,572 B1 | 11/2001 | LaRocca et al. |
| 6,314,573 B1 | 11/2001 | Gordon et al. |
| 6,314,575 B1 | 11/2001 | Billock et al. |
| 6,317,777 B1 | 11/2001 | Skarbo et al. |
| 6,317,881 B1 | 11/2001 | Shah-Nazaroff et al. |
| 6,317,885 B1 | 11/2001 | Fries |
| 6,323,911 B1 | 11/2001 | Schein et al. |
| 6,324,694 B1 | 11/2001 | Watts et al. |
| 6,326,982 B1 | 12/2001 | Wu et al. |
| 6,327,628 B1 | 12/2001 | Anuff et al. |
| 6,335,936 B1 | 1/2002 | Bossemeyer, Jr. et al. |
| 6,347,400 B1 | 2/2002 | Ohkura et al. |
| 6,349,410 B1 | 2/2002 | Lortz |
| 6,353,448 B1 | 3/2002 | Scarborough et al. |
| 6,357,046 B1 | 3/2002 | Thompson et al. |
| 6,359,636 B1 | 3/2002 | Schindler et al. |
| 6,360,367 B1 | 3/2002 | Yamamoto |
| 6,362,841 B1 | 3/2002 | Nykanen |
| 6,367,078 B1 | 4/2002 | Lasky |
| 6,378,130 B1 | 4/2002 | Adams |
| 6,381,332 B1 | 4/2002 | Glaab |
| 6,385,614 B1 | 5/2002 | Vellandi |
| 6,393,585 B1 | 5/2002 | Houha et al. |
| 6,396,549 B1 | 5/2002 | Weber |
| 6,397,386 B1 | 5/2002 | O'Conner et al. |
| 6,400,280 B1 | 6/2002 | Osakabe |
| 6,401,243 B1 | 6/2002 | Suzuki |
| 6,405,239 B1 | 6/2002 | Addington et al. |
| 6,408,128 B1 | 6/2002 | Abecassis |
| 6,421,067 B1 | 7/2002 | Kamen et al. |
| 6,429,899 B1 | 8/2002 | Nio et al. |
| 6,434,748 B1 | 8/2002 | Shen et al. |
| 6,441,862 B1 | 8/2002 | Yuen et al. |
| 6,442,332 B1 | 8/2002 | Knudson et al. |
| 6,442,755 B1* | 8/2002 | Lemmons et al. ............... 725/47 |
| 6,442,756 B1 | 8/2002 | Durden et al. |
| 6,446,261 B1 | 9/2002 | Rosser |
| 6,446,262 B1 | 9/2002 | Malaure et al. |
| 6,452,611 B1 | 9/2002 | Gerba et al. |
| 6,460,181 B1 | 10/2002 | Donnelly |
| 6,463,585 B1 | 10/2002 | Hendricks et al. |
| 6,476,833 B1 | 11/2002 | Moshfeghi |
| 6,480,669 B1 | 11/2002 | Tsumagari et al. |
| 6,481,010 B2 | 11/2002 | Nishikawa et al. |
| 6,481,011 B1 | 11/2002 | Lemmons |
| 6,484,318 B1 | 11/2002 | Shioda et al. |
| 6,486,920 B2 | 11/2002 | Arai et al. |
| 6,501,902 B1 | 12/2002 | Wang |
| 6,505,348 B1 | 1/2003 | Knowles et al. |
| 6,507,949 B1 | 1/2003 | Jonason et al. |
| 6,510,556 B1 | 1/2003 | Kusaba et al. |
| 6,512,552 B1 | 1/2003 | Subramanian |
| 6,515,680 B1 | 2/2003 | Hendricks et al. |
| 6,515,710 B1 | 2/2003 | Koshimuta |
| 6,518,986 B1 | 2/2003 | Mugura |
| 6,519,770 B2 | 2/2003 | Ford |
| 6,526,575 B1 | 2/2003 | McCoy et al. |
| 6,526,577 B1 | 2/2003 | Knudson et al. |
| 6,530,083 B1 | 3/2003 | Liebenow |
| 6,532,589 B1 | 3/2003 | Proehl et al. |
| 6,532,593 B1 | 3/2003 | Moroney |
| 6,536,041 B1 | 3/2003 | Knudson et al. |
| 6,539,548 B1 | 3/2003 | Hendricks et al. |
| 6,543,053 B1 | 4/2003 | Li et al. |
| 6,545,669 B1 | 4/2003 | Kinawi et al. |
| 6,557,030 B1 | 4/2003 | Hoang |
| 6,563,515 B1 | 5/2003 | Reynolds et al. |
| 6,564,005 B1 | 5/2003 | Berstis |
| 6,564,378 B1 | 5/2003 | Satterfield et al. |
| 6,564,379 B1 | 5/2003 | Knudson et al. |
| 6,564,383 B1 | 5/2003 | Combs et al. |
| 6,571,390 B1 | 5/2003 | Dunn et al. |
| 6,574,793 B1 | 6/2003 | Ngo et al. |
| 6,578,077 B1 | 6/2003 | Rakoshitz et al. |
| 6,578,201 B1 | 6/2003 | LaRocca et al. |
| 6,594,699 B1 | 7/2003 | Sahai et al. |
| 6,594,825 B1 | 7/2003 | Goldschmidt Iki et al. |
| 6,594,826 B1 | 7/2003 | Rao et al. |
| 6,600,496 B1 | 7/2003 | Wagner et al. |
| 6,601,103 B1 | 7/2003 | Goldschmidt Iki et al. |
| 6,604,240 B2 | 8/2003 | Ellis et al. |
| 6,609,253 B1 | 8/2003 | Swix et al. |
| 6,611,958 B1 | 8/2003 | Shintani et al. |
| 6,614,440 B1 | 9/2003 | Bowen et al. |
| 6,614,988 B1 | 9/2003 | Sampsell |
| 6,628,302 B2 | 9/2003 | White et al. |
| 6,631,413 B1 | 10/2003 | Aggarwal et al. |
| 6,642,939 B1 | 11/2003 | Vallone et al. |
| 6,647,548 B1 | 11/2003 | Lu et al. |
| 6,651,044 B1 | 11/2003 | Stoneman |
| 6,662,365 B1 | 12/2003 | Sullivan et al. |
| 6,664,984 B2 | 12/2003 | Schlarb et al. |
| 6,665,869 B1 | 12/2003 | Ellis et al. |
| 6,671,328 B1 | 12/2003 | Poon et al. |
| 6,675,384 B1 | 1/2004 | Block et al. |
| 6,675,385 B1 | 1/2004 | Wang |
| 6,675,388 B1 | 1/2004 | Beckmann et al. |
| 6,678,891 B1 | 1/2004 | Wilcox et al. |
| 6,681,395 B1 | 1/2004 | Nishi |
| 6,681,396 B1 | 1/2004 | Bates et al. |
| 6,684,025 B1 | 1/2004 | Perlman |
| 6,684,400 B1 | 1/2004 | Goode et al. |
| 6,690,391 B1 | 2/2004 | Proehl et al. |
| 6,697,376 B1 | 2/2004 | Son et al. |
| 6,698,023 B2 | 2/2004 | Levitan |
| 6,701,523 B1 | 3/2004 | Hancock et al. |
| 6,701,528 B1 | 3/2004 | Arsenault et al. |
| 6,706,311 B2 | 3/2004 | Wong et al. |
| 6,708,336 B1 | 3/2004 | Bruette |
| 6,717,590 B1 | 4/2004 | Sullivan et al. |
| 6,718,552 B1 | 4/2004 | Goode |
| 6,721,953 B1* | 4/2004 | Bates et al. ..................... 725/39 |
| 6,725,461 B1 | 4/2004 | Dougherty et al. |
| 6,731,310 B2 | 5/2004 | Craycroft et al. |
| 6,732,366 B1 | 5/2004 | Russo |
| 6,732,367 B1 | 5/2004 | Ellis et al. |
| 6,732,369 B1 | 5/2004 | Schein et al. |
| 6,732,372 B2 | 5/2004 | Tomita et al. |
| 6,735,572 B2 | 5/2004 | Landesmann |
| 6,738,978 B1 | 5/2004 | Hendricks et al. |
| 6,738,982 B1 | 5/2004 | Jerding |
| 6,754,904 B1* | 6/2004 | Cooper et al. .................. 725/32 |
| 6,754,906 B1 | 6/2004 | Finseth et al. |
| 6,757,909 B1 | 6/2004 | Maruo et al. |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,209 B1 | 8/2004 | Chernock et al. |
| 6,772,433 B1 | 8/2004 | LaJoie et al. |
| 6,782,550 B1 | 8/2004 | Cao |
| 6,791,620 B1 | 9/2004 | Elswick et al. |
| 6,792,615 B1 | 9/2004 | Rowe et al. |
| 6,801,533 B1 | 10/2004 | Barkley |
| 6,817,028 B1 | 11/2004 | Jerding et al. |
| 6,832,386 B1 | 12/2004 | Jerding et al. |
| 6,847,969 B1 | 1/2005 | Mathai et al. |
| 6,876,628 B2 | 4/2005 | Howard et al. |
| 6,898,762 B2 | 5/2005 | Ellis et al. |
| 6,901,385 B2 | 5/2005 | Okamoto et al. |
| 6,934,964 B1 | 8/2005 | Schaffer et al. |
| 6,938,258 B1 | 8/2005 | Weinberger et al. |
| 6,957,386 B1 | 10/2005 | Nishina et al. |
| 6,968,372 B1 | 11/2005 | Thompson et al. |
| 6,978,310 B1 | 12/2005 | Rodriguez et al. |
| 6,978,475 B1 | 12/2005 | Kunin et al. |
| 6,986,156 B1 | 1/2006 | Rodriguez et al. |
| 6,987,728 B2 | 1/2006 | Deshpande |
| 6,990,676 B1 | 1/2006 | Proehl et al. |
| 6,990,677 B1 | 1/2006 | Pietraszak et al. |

(56) References Cited

U.S. PATENT DOCUMENTS

| | | |
|---|---|---|
| 6,993,782 B1 | 1/2006 | Newberry et al. |
| 7,010,492 B1 | 3/2006 | Bassett et al. |
| 7,010,801 B1 | 3/2006 | Jerding et al. |
| 7,024,681 B1 | 4/2006 | Fransman et al. |
| 7,039,944 B1 | 5/2006 | Cho et al. |
| 7,062,466 B2 | 6/2006 | Wagner et al. |
| 7,065,709 B2 | 6/2006 | Ellis et al. |
| 7,069,575 B1 | 6/2006 | Goode et al. |
| 7,076,734 B2 | 7/2006 | Wolff et al. |
| 7,086,077 B2 | 8/2006 | Giammaressi |
| 7,103,903 B1 | 9/2006 | Kydd |
| 7,103,905 B2 | 9/2006 | Novak |
| 7,110,714 B1 | 9/2006 | Kay et al. |
| 7,117,440 B2 | 10/2006 | Gordon et al. |
| 7,120,926 B1 | 10/2006 | Safadi et al. |
| 7,143,430 B1 | 11/2006 | Fingerman et al. |
| 7,143,432 B1 | 11/2006 | Brooks et al. |
| 7,150,031 B1 | 12/2006 | Rodriguez et al. |
| 7,155,733 B2 | 12/2006 | Rodriguez et al. |
| 7,168,086 B1 | 1/2007 | Carpenter et al. |
| 7,180,422 B2 | 2/2007 | Milenkovic et al. |
| 7,185,355 B1 | 2/2007 | Ellis et al. |
| 7,188,356 B1 | 3/2007 | Miura et al. |
| 7,194,757 B1 | 3/2007 | Fish et al. |
| 7,200,857 B1 | 4/2007 | Rodriguez et al. |
| 7,237,251 B1 | 6/2007 | Oz et al. |
| 7,243,364 B2 | 7/2007 | Dunn et al. |
| 7,246,367 B2 | 7/2007 | Livonen |
| 7,249,366 B1 | 7/2007 | Flavin |
| 7,324,552 B1 | 1/2008 | Galand et al. |
| 7,324,553 B1 | 1/2008 | Varier et al. |
| 7,334,251 B2 | 2/2008 | Rodriguez et al. |
| 7,340,759 B1 | 3/2008 | Rodriguez |
| 7,343,614 B1 | 3/2008 | Hendricks et al. |
| 7,356,477 B1 | 4/2008 | Allan et al. |
| 7,404,200 B1 | 7/2008 | Hailey et al. |
| 7,496,943 B1 | 2/2009 | Goldberg et al. |
| 7,496,945 B2 | 2/2009 | Rodriguez |
| 7,509,267 B1 | 3/2009 | Yarmolich et al. |
| 7,512,964 B2 | 3/2009 | Rodriguez et al. |
| 7,526,788 B2 | 4/2009 | Rodriguez |
| 7,535,888 B1 | 5/2009 | Carlucci et al. |
| 7,647,549 B2 | 1/2010 | Denoual et al. |
| 7,673,314 B2 | 3/2010 | Ellis et al. |
| 7,685,520 B2 | 3/2010 | Rashkovskiy et al. |
| 7,707,614 B2 | 4/2010 | Krikorian et al. |
| 7,925,534 B2 | 4/2011 | Amano et al. |
| 7,934,232 B1 | 4/2011 | Jerding et al. |
| 7,961,643 B2 | 6/2011 | McDonald et al. |
| 7,962,370 B2 | 6/2011 | Rodriguez et al. |
| 7,975,277 B1 | 7/2011 | Jerding et al. |
| 7,992,163 B1 | 8/2011 | Jerding et al. |
| 7,992,166 B2 | 8/2011 | Jerding et al. |
| 8,005,713 B1 | 8/2011 | Sanz-Pastor et al. |
| 8,006,262 B2 | 8/2011 | Rodriguez et al. |
| 8,006,273 B2 | 8/2011 | Rodriguez et al. |
| 8,020,184 B2 | 9/2011 | Jerding et al. |
| 8,032,914 B2 | 10/2011 | Rodriguez |
| 8,037,504 B2 | 10/2011 | Jerding et al. |
| 8,056,106 B2 | 11/2011 | Rodriguez et al. |
| 8,069,259 B2 | 11/2011 | Rodriguez et al. |
| 8,079,047 B1 | 12/2011 | Jerding et al. |
| 8,161,388 B2 | 4/2012 | Rodriguez et al. |
| 8,189,472 B2 | 5/2012 | McDonald et al. |
| 8,191,093 B2 | 5/2012 | Rodriguez |
| 8,255,951 B2 | 8/2012 | Jerding et al. |
| 8,516,525 B1 | 8/2013 | Jerding et al. |
| 8,621,353 B2 | 12/2013 | Schlarb et al. |
| 8,640,172 B2 | 1/2014 | Rodriguez et al. |
| 8,707,153 B2 | 4/2014 | Rodriguez et al. |
| 8,745,656 B2 | 6/2014 | Rodriguez et al. |
| 2001/0003846 A1 | 6/2001 | Rowe et al. |
| 2001/0013125 A1 | 8/2001 | Kitsukawa et al. |
| 2001/0013127 A1 | 8/2001 | Tomita et al. |
| 2001/0029523 A1 | 10/2001 | Mcternan et al. |
| 2001/0030667 A1 | 10/2001 | Kelts |
| 2001/0032293 A1 | 10/2001 | Korst et al. |
| 2001/0032335 A1 | 10/2001 | Jones |
| 2001/0034763 A1 | 10/2001 | Jacobs et al. |
| 2001/0036271 A1 | 11/2001 | Javed |
| 2001/0044744 A1 | 11/2001 | Rhoads |
| 2001/0047517 A1 | 11/2001 | Christopoulos et al. |
| 2002/0002642 A1 | 1/2002 | Tyson et al. |
| 2002/0007485 A1 | 1/2002 | Rodriguez et al. |
| 2002/0013836 A1 | 1/2002 | Friedman et al. |
| 2002/0026496 A1 | 2/2002 | Boyer et al. |
| 2002/0026638 A1 | 2/2002 | Eldering et al. |
| 2002/0032638 A1 | 3/2002 | Arora et al. |
| 2002/0032728 A1 | 3/2002 | Sako et al. |
| 2002/0032905 A1 | 3/2002 | Sherr et al. |
| 2002/0042913 A1 | 4/2002 | Ellis et al. |
| 2002/0042920 A1 | 4/2002 | Thomas et al. |
| 2002/0044762 A1 | 4/2002 | Wood et al. |
| 2002/0049804 A1 | 4/2002 | Rodriguez et al. |
| 2002/0049978 A1 | 4/2002 | Rodriguez et al. |
| 2002/0056098 A1 | 5/2002 | White |
| 2002/0056118 A1 | 5/2002 | Hunter et al. |
| 2002/0057336 A1 | 5/2002 | Gaul et al. |
| 2002/0062481 A1 | 5/2002 | Slaney et al. |
| 2002/0069105 A1 | 6/2002 | do Rosario Botelho |
| 2002/0069218 A1 | 6/2002 | Sull et al. |
| 2002/0069412 A1 | 6/2002 | Philips |
| 2002/0078176 A1 | 6/2002 | Nomura et al. |
| 2002/0083443 A1 | 6/2002 | Eldering et al. |
| 2002/0087981 A1 | 7/2002 | Daniels |
| 2002/0101367 A1 | 8/2002 | Geiger et al. |
| 2002/0104083 A1 | 8/2002 | Hendricks et al. |
| 2002/0108125 A1 | 8/2002 | Joao |
| 2002/0124249 A1 | 9/2002 | Shintani et al. |
| 2002/0124255 A1 | 9/2002 | Reichardt et al. |
| 2002/0128908 A1 | 9/2002 | Levin et al. |
| 2002/0129362 A1 | 9/2002 | Chang et al. |
| 2002/0138831 A1 | 9/2002 | Wachtfogel et al. |
| 2002/0186957 A1 | 12/2002 | Yuen |
| 2003/0002862 A1 | 1/2003 | Rodriguez et al. |
| 2003/0014753 A1 | 1/2003 | Beach et al. |
| 2003/0020744 A1 | 1/2003 | Ellis et al. |
| 2003/0023971 A1* | 1/2003 | Martinolich et al. ........... 725/32 |
| 2003/0030679 A1 | 2/2003 | Jain |
| 2003/0031465 A1 | 2/2003 | Blake |
| 2003/0037068 A1 | 2/2003 | Thomas et al. |
| 2003/0037332 A1 | 2/2003 | Chapin et al. |
| 2003/0040962 A1 | 2/2003 | Lewis |
| 2003/0061619 A1 | 3/2003 | Giammaressi |
| 2003/0067554 A1 | 4/2003 | Klarfeld et al. |
| 2003/0074214 A1 | 4/2003 | Kelliher |
| 2003/0074257 A1 | 4/2003 | Saveliev et al. |
| 2003/0079224 A1 | 4/2003 | Komar et al. |
| 2003/0079227 A1 | 4/2003 | Knowles et al. |
| 2003/0088872 A1 | 5/2003 | Maissel et al. |
| 2003/0101451 A1 | 5/2003 | Bentolila et al. |
| 2003/0101454 A1 | 5/2003 | Ozer et al. |
| 2003/0124973 A1 | 7/2003 | Sie et al. |
| 2003/0126425 A1 | 7/2003 | Yang et al. |
| 2003/0131356 A1 | 7/2003 | Proehl et al. |
| 2003/0135853 A1 | 7/2003 | Goldman et al. |
| 2003/0154475 A1 | 8/2003 | Rodriguez et al. |
| 2003/0154486 A1 | 8/2003 | Dunn et al. |
| 2003/0159147 A1 | 8/2003 | Young et al. |
| 2003/0174243 A1 | 9/2003 | Arbeiter et al. |
| 2003/0188313 A1 | 10/2003 | Ellis et al. |
| 2003/0193486 A1 | 10/2003 | Estrop |
| 2003/0206553 A1 | 11/2003 | Surcouf et al. |
| 2003/0219228 A1 | 11/2003 | Thiagarajan et al. |
| 2003/0221194 A1 | 11/2003 | Thiagarajan et al. |
| 2004/0034867 A1 | 2/2004 | Rashkovskiy et al. |
| 2004/0049787 A1 | 3/2004 | Maissel et al. |
| 2004/0107436 A1 | 6/2004 | Ishizaki |
| 2004/0117831 A1 | 6/2004 | Ellis et al. |
| 2004/0128685 A1 | 7/2004 | Hassell et al. |
| 2004/0133907 A1 | 7/2004 | Rodriguez et al. |
| 2004/0163114 A1 | 8/2004 | Rodriguez et al. |
| 2004/0163117 A1 | 8/2004 | Rodriguez et al. |
| 2004/0168191 A1 | 8/2004 | Jerding et al. |

(56) References Cited

U.S. PATENT DOCUMENTS

| | | |
|---|---|---|
| 2004/0181801 A1 | 9/2004 | Hagen et al. |
| 2004/0221310 A1 | 11/2004 | Herrington et al. |
| 2004/0261098 A1 | 12/2004 | Macrae et al. |
| 2004/0261112 A1 | 12/2004 | Hicks et al. |
| 2004/0261125 A1 | 12/2004 | Ellis et al. |
| 2005/0005308 A1 | 1/2005 | Logan et al. |
| 2005/0008074 A1 | 1/2005 | van Beek et al. |
| 2005/0028190 A1 | 2/2005 | Rodriguez et al. |
| 2005/0044565 A1 | 2/2005 | Jerding et al. |
| 2005/0044566 A1 | 2/2005 | Jerding et al. |
| 2005/0044577 A1 | 2/2005 | Jerding et al. |
| 2005/0071882 A1 | 3/2005 | Rodriguez et al. |
| 2005/0076360 A1 | 4/2005 | Jerding et al. |
| 2005/0091693 A1 | 4/2005 | Amine et al. |
| 2005/0111046 A1 | 5/2005 | Kurumisawa et al. |
| 2005/0138657 A1 | 6/2005 | Leftwich |
| 2005/0155056 A1 | 7/2005 | Knee et al. |
| 2005/0160468 A1 | 7/2005 | Rodriguez et al. |
| 2005/0188415 A1 | 8/2005 | Riley |
| 2005/0204387 A1 | 9/2005 | Knudson et al. |
| 2005/0204388 A1 | 9/2005 | Knudson et al. |
| 2005/0213506 A1 | 9/2005 | Wakumoto et al. |
| 2005/0216936 A1 | 9/2005 | Knudson et al. |
| 2005/0235319 A1* | 10/2005 | Carpenter et al. ............ 725/52 |
| 2005/0240961 A1 | 10/2005 | Jerding et al. |
| 2005/0251822 A1 | 11/2005 | Knowles et al. |
| 2005/0278741 A1 | 12/2005 | Robarts et al. |
| 2005/0283797 A1 | 12/2005 | Eldering et al. |
| 2005/0283810 A1 | 12/2005 | Ellis et al. |
| 2005/0289618 A1 | 12/2005 | Hardin |
| 2006/0020982 A1 | 1/2006 | Jerding et al. |
| 2006/0026080 A1 | 2/2006 | Rodriguez et al. |
| 2006/0026665 A1 | 2/2006 | Rodriguez et al. |
| 2006/0059525 A1 | 3/2006 | Jerding et al. |
| 2006/0070107 A1 | 3/2006 | Renkis |
| 2006/0088105 A1 | 4/2006 | Shen et al. |
| 2006/0112434 A1 | 5/2006 | Banker et al. |
| 2006/0206913 A1 | 9/2006 | Jerding et al. |
| 2006/0271933 A1 | 11/2006 | Agassi et al. |
| 2006/0271964 A1 | 11/2006 | Rodriguez et al. |
| 2006/0271973 A1 | 11/2006 | Jerding et al. |
| 2007/0019670 A1 | 1/2007 | Falardeau |
| 2007/0053293 A1 | 3/2007 | McDonald et al. |
| 2007/0094690 A1 | 4/2007 | Rodriguez et al. |
| 2007/0136748 A1 | 6/2007 | Rodriguez et al. |
| 2007/0186240 A1 | 8/2007 | Ward, III et al. |
| 2008/0010658 A1 | 1/2008 | Abbott et al. |
| 2008/0046947 A1 | 2/2008 | Katznelson |
| 2008/0098421 A1 | 4/2008 | Rodriguez et al. |
| 2008/0098422 A1 | 4/2008 | Rodriguez et al. |
| 2008/0101460 A1 | 5/2008 | Rodriguez |
| 2008/0104637 A1 | 5/2008 | Rodriguez et al. |
| 2008/0137755 A1 | 6/2008 | Onur et al. |
| 2008/0155631 A1 | 6/2008 | Liwerant et al. |
| 2008/0216111 A1 | 9/2008 | Alten et al. |
| 2008/0229361 A1 | 9/2008 | Jerding et al. |
| 2008/0279217 A1 | 11/2008 | McDonald et al. |
| 2008/0281968 A1 | 11/2008 | Rodriguez |
| 2008/0282307 A1 | 11/2008 | McDonald et al. |
| 2008/0282308 A1 | 11/2008 | McDonald et al. |
| 2009/0141794 A1 | 6/2009 | Rodriguez et al. |
| 2009/0150946 A1 | 6/2009 | Rodriguez et al. |
| 2009/0150957 A1 | 6/2009 | Jerding et al. |
| 2009/0150958 A1 | 6/2009 | Jerding et al. |
| 2009/0150959 A1 | 6/2009 | Jerding et al. |
| 2009/0158306 A1 | 6/2009 | Rodriguez et al. |
| 2009/0158324 A1 | 6/2009 | Rodriguez et al. |
| 2009/0158329 A1 | 6/2009 | Rodriguez et al. |
| 2009/0158331 A1 | 6/2009 | Rodriguez et al. |
| 2009/0158332 A1 | 6/2009 | Rodriguez et al. |
| 2009/0158335 A1 | 6/2009 | Rodriguez et al. |
| 2009/0158339 A1 | 6/2009 | Rodriguez et al. |
| 2009/0158352 A1 | 6/2009 | Rodriguez et al. |
| 2009/0158354 A1 | 6/2009 | Rodriguez et al. |
| 2009/0158355 A1 | 6/2009 | Rodriguez et al. |
| 2009/0158363 A1 | 6/2009 | Rodriguez et al. |
| 2009/0183081 A1 | 7/2009 | Rodriguez et al. |
| 2009/0190028 A1 | 7/2009 | Rodriguez et al. |
| 2009/0193468 A1 | 7/2009 | Rodriguez |
| 2009/0193471 A1 | 7/2009 | Rodriguez |
| 2009/0199249 A1 | 8/2009 | Rodriguez et al. |
| 2009/0276808 A1 | 11/2009 | Jerding et al. |
| 2009/0282372 A1 | 11/2009 | Jerding et al. |
| 2009/0282440 A1 | 11/2009 | Rodriguez |
| 2010/0242063 A1 | 9/2010 | Slaney et al. |
| 2011/0279863 A1 | 11/2011 | Chang et al. |
| 2012/0188445 A1 | 7/2012 | Rodriguez et al. |
| 2012/0233654 A1 | 9/2012 | McDonald et al. |
| 2012/0240147 A1 | 9/2012 | Rodriguez |
| 2012/0324488 A1 | 12/2012 | Jerding et al. |
| 2014/0282701 A1 | 9/2014 | Rodriguez et al. |

FOREIGN PATENT DOCUMENTS

| | | |
|---|---|---|
| CA | 2 475 723 C | 1/2011 |
| CA | 2 408 289 | 8/2012 |
| EP | 0 572 090 A2 | 12/1993 |
| EP | 0 673 159 A1 | 9/1995 |
| EP | 0 680 214 A2 | 11/1995 |
| EP | 0 725 538 A2 | 8/1996 |
| EP | 0 763 936 A2 | 3/1997 |
| EP | 0 811 939 A2 | 12/1997 |
| EP | 0 838 915 A2 | 4/1998 |
| EP | 0 849 948 A2 | 6/1998 |
| EP | 0 854 645 A2 | 7/1998 |
| EP | 0 891 084 A2 | 1/1999 |
| EP | 0 896 318 A2 | 2/1999 |
| EP | 0 909 095 A1 | 4/1999 |
| EP | 0 701 756 B1 | 12/1999 |
| EP | 0 989 751 A2 | 3/2000 |
| EP | 1 052 644 A | 11/2000 |
| EP | 1 069 801 A1 | 1/2001 |
| EP | 1 075 143 A1 | 2/2001 |
| EP | 1 113 668 A1 | 4/2001 |
| EP | 1 111 572 A2 | 6/2001 |
| EP | 1 161 085 A1 | 12/2001 |
| GB | 2 343 051 A | 4/2000 |
| JP | 8-289219 | 11/1996 |
| JP | 9-322022 | 12/1997 |
| JP | 10-143734 | 5/1998 |
| JP | 11-73361 | 3/1999 |
| JP | 11-73394 | 3/1999 |
| JP | 11-164284 | 6/1999 |
| JP | 2000-101941 | 4/2000 |
| JP | 2001 67786 | 3/2001 |
| WO | WO 92/22983 | 12/1992 |
| WO | WO 94/14284 | 6/1994 |
| WO | 95/25799 | 10/1995 |
| WO | WO 96/17467 | 6/1996 |
| WO | WO 96/33579 | 10/1996 |
| WO | WO 96/34486 | 10/1996 |
| WO | WO 96/34491 | 10/1996 |
| WO | 96/41470 | 12/1996 |
| WO | WO 96/41477 | 12/1996 |
| WO | WO 96/41478 | 12/1996 |
| WO | WO 97/34414 | 9/1997 |
| WO | WO 98/03012 | 1/1998 |
| WO | WO 98/26528 | 6/1998 |
| WO | WO 98/31116 | 7/1998 |
| WO | WO 98/37695 | 8/1998 |
| WO | WO 98/39893 | 9/1998 |
| WO | WO 98/47279 | 10/1998 |
| WO | WO 98/48566 | 10/1998 |
| WO | WO 98/56172 | 12/1998 |
| WO | WO 98/56173 | 12/1998 |
| WO | WO 98/56188 | 12/1998 |
| WO | WO 99/01984 | 1/1999 |
| WO | WO 99/04560 | 1/1999 |
| WO | WO 99/04561 | 1/1999 |
| WO | WO 99/12109 | 3/1999 |
| WO | WO 99/14947 | 3/1999 |
| WO | WO 99/35831 | 7/1999 |
| WO | WO 99/45701 | 9/1999 |
| WO | WO 99/49717 | 10/1999 |

(56) References Cited

FOREIGN PATENT DOCUMENTS

| | | |
|---|---|---|
| WO | WO 99/52285 | 10/1999 |
| WO | WO 99/57903 | 11/1999 |
| WO | WO 99/60790 | 11/1999 |
| WO | 99/65237 | 12/1999 |
| WO | WO 99/66719 | 12/1999 |
| WO | 00/01149 | 1/2000 |
| WO | WO 00/02385 | 1/2000 |
| WO | WO 00/04726 | 1/2000 |
| WO | WO 00/05889 | 2/2000 |
| WO | WO 00/30354 | 5/2000 |
| WO | WO 00/40017 | 7/2000 |
| WO | WO 00/46988 | 8/2000 |
| WO | WO 00/49801 | 8/2000 |
| WO | 00/58967 A1 | 10/2000 |
| WO | WO 00/59202 | 10/2000 |
| WO | WO 00/60482 | 10/2000 |
| WO | WO 00/78031 A2 | 12/2000 |
| WO | WO 00/78045 A1 | 12/2000 |
| WO | WO 00/78047 A1 | 12/2000 |
| WO | WO 00/78048 A1 | 12/2000 |
| WO | WO 01/06788 A1 | 1/2001 |
| WO | WO 01/20907 A1 | 3/2001 |
| WO | WO 01/24067 A1 | 4/2001 |
| WO | WO 01/56273 A1 | 8/2001 |
| WO | WO 01/67736 A2 | 9/2001 |
| WO | WO 01/72042 A1 | 9/2001 |
| WO | WO 01/76245 A2 | 10/2001 |
| WO | WO 01/77888 A2 | 10/2001 |
| WO | WO 01/84831 A2 | 11/2001 |
| WO | WO 02/097584 A2 | 12/2002 |
| WO | WO 03/003164 A2 | 1/2003 |
| WO | WO 03/003709 A2 | 1/2003 |
| WO | WO 03/014873 A2 | 2/2003 |
| WO | WO 03/024084 A2 | 3/2003 |
| WO | WO 03/042787 A2 | 5/2003 |
| WO | WO 03/069898 A1 | 8/2003 |
| WO | WO 2004/091219 A1 | 10/2004 |
| WO | WO 2004/100500 A2 | 11/2004 |
| WO | WO 2005/071658 A1 | 8/2005 |
| WO | WO 2007/030370 A1 | 3/2007 |

OTHER PUBLICATIONS

U.S. Office Action mailed Sep. 22, 2014 in U.S. Appl. No. 13/482,689, 74 pgs.
EP Communication cited in Appln No. 02 794 161.6 mailed Apr. 2, 2009, 4 pgs.
EP Communication cited in Appln No. 02 794 161.6 mailed Oct. 22, 2009, 3 pgs.
PCT Search Report cited in International Application No. PCT/US02/37282 mailed Feb. 7, 2003, 4 pgs.
PCT International Search Report in Appln No. PCT/US02/14874 mailed Nov. 20, 2002, 4 pgs.
PCT Written Opinion in Appln No. PCT/US02/14874 mailed Feb. 11, 2003, 5 pgs.
EP Communication cited in Appln No. 02 736 739.0 mailed Oct. 13, 2009, 3 pgs.
EP Communication cited in Appln No. 02 736 739.0 mailed Jan. 17, 2012, 4 pgs.
Canadian Office Action mailed Oct. 2, 2012 in Appln No. 2,658,766, 2 pgs.
EP Communication mailed May 26, 2014 in Appln No. 02 782 347.5, 6 pgs.
EP Communication mailed Jun. 3, 2014 in Appln No. 03 745 157.2, 6 pgs.
U.S. Appl. No. 11/170,348, filed Jun. 29, 2005 entitled "Methods and Systems for Advertising During Video-on-Demand Suspensions".
U.S. Appl. No. 11/460,516, filed Jul. 27, 2006 entitled "Video Promotional and Advertising Systems for Video on Demand System".
U.S. Appl. No. 12/372,887, filed Feb. 18, 2009 entitled "Selection of Purchasable Enhancements of a Television Service".
U.S. Appl. No. 09/330,792, filed Jun. 11, 1999 entitled "Series Reminders and Series Recording from an Interactive Television program Guide".
U.S. Appl. No. 09/378,533, filed Aug. 20, 1999 entitled "Electronic Program Guide with Advance Notification".
U.S. Appl. No. 09/518,041, filed Mar. 2, 2000 entitled "Apparatus and Method for Providing a Plurality of Interactive Program Guide Initial Arrangements".
U.S. Appl. No. 09/542,484, filed Apr. 3, 2000 entitled "System for Providing Alternative Services".
U.S. Appl. No. 09/565,931, filed May 4, 2000 entitled "Navigation Paradigm for Access to Television Services".
U.S. Appl. No. 09/590,434, filed Jun. 9, 2000 entitled "Video Promotional and Advertising Systems for Video on Demand System".
U.S. Appl. No. 09/590,488, filed Jun. 9, 2000 entitled "User Interface Navigational System with Parental Control for Video on Demand System".
U.S. Appl. No. 09/590,521, filed Jun. 9, 2000 entitled "Systems and Methods for Adaptive Scheduling and Dynamic Bandwidth Resource Allocation Management in a Digital Broadband Delivery System".
U.S. Appl. No. 09/590,904, filed Jun. 9, 2000 entitled "Program Information Searching System for Interactive Program Guide".
U.S. Appl. No. 09/591,356, filed Jun. 9, 2000 entitled "Future Program Options Menu System for Interactive Program Guide".
U.S. Appl. No. 09/692,920, filed Oct. 20, 2000 entitled "Media-on-Demand Title Indexing System".
U.S. Appl. No. 09/692,995, filed Oct. 20, 2000 entitled "Media-on-Demand Bookmark System".
U.S. Appl. No. 09/693,115, filed Oct. 20, 2000 entitled "Media Services Window Configuration System".
U.S. Appl. No. 09/693,288, filed Oct. 20, 2000 entitled "Media-on-Demand Rental Duration Management System".
U.S. Appl. No. 09/693,790, filed Oct. 20, 2000 entitled "Integrated Searching System for Interactive Media Guide".
U.S. Appl. No. 10/957,849 filed Oct. 4, 2004, entitled "User Input for Access to Television Services".
U.S. Appl. No. 10/957,854, filed Oct. 4, 2004, entitled "Menu Operation for Access to Television Services".
U.S. Appl. No. 10/957,942, filed Oct. 4, 2004, entitled "Control Access to Television Services".
U.S. Appl. No. 12/389,128, filed Feb. 19, 2009, entitled "Configuration of TV Services via Alternate Communication".
"A Brief History of the Trailer," http://www.movietrailertrash.com/views/history.html, 11 pages (Publicly known at least as early as Dec. 20, 2003).
Addington, Timothy H., "System Architecture Specification for Video-On-Demand Application Development on the Explorer 2000™ Digital Home Communications Terminal", Revision 1.10r Review Copy (Mar. 4, 1999), 53 pages.
Alberico, G. et al., "Satellite Interactive Multimedia: A New Opportunity for Broadcasters," International Broadcasting Convention, Conference Publication No. 447, pp. 18-23 (Sep. 12-16, 1997).
ATI Multimedia Center 7.9, User's Guide, ATI Technologies Inc., pp. i-vi and 1-96 (Copyright 2002).
Barth et al., "10 Fernsehen am PC", Suse GMBH, XP-002324319, pp. 143-149 (2001).
"Client User Interface Specification (Phase I) for Video-On-Demand Application Development on the Explorer 2000™ Digital Home Communications Terminal", Revision 1.10 (Aug. 31, 1998), 20 pages.
Cunningham et al., "5 Das X Window System"., Suse GMBH, XP-002324320, pp. 129-180 (2001).
Definition of "flag", Microsoft Press: Computer User's Dictionary, 3 pages (1998).
Definition of "renting", Webster's II: New College Dictionary, 1995, Houghton Mifflin Company, p. 939.
"Evidence of illustrative movie release years," Retrieved from the Internet Movie Database using Internet, http://www.imdb.com, 19 pages (Retrieved on Jun. 6, 2005).
"Industry Leading Software Vendors Endorse BroadVision's Next Generation of Retail and Business-To-Business E-Commerce Application Solutions," PR Newswire, Jun. 14, 1999, 4 pages.
"ISO/IEC 13818-6 Information technology—Generic coding of moving pictures and associated audio information—Part 6: Extensions for DSM-CC," Chapter 4, 113 pp. (Sep. 1, 1998).

(56) References Cited

OTHER PUBLICATIONS

Kevin, "Change Screen Resolution in Windows (Tips, Tricks, Tweaks, and Setting)," http://www.tacktech.com/display.cfm?tid=207, pp. 1-3 (Oct. 26, 2002).
Leftwitch et al., "StarSight Interactive Television Program Guide—Functional/International Architecture Specification Document, Interaction Analysis and Design Project—Phase III," published no later than Dec. 15, 1995, 36 pages.
Little et al., "Prospects for Interactive Video-On-Demand", IEEE Multimedia, IEEE Service Center, New York, NY US, vol. 1 No. 3, Sep. 1994, pp. 14-24, XP000476885 ISSN: 1070-986X.
McFedries, "The Complete Idiot's Guide to Windows 95," Que, 2nd Edition, p. 49 (1997).
"Netcaster Developer's Guide," Devedge Online Documentation, Netscape Communications Corporation, http://developer.netscape.com/docs/manuals/netcast/devguide/ index.html, XP-002166370, 82 pages (Sep. 25, 1997).
"Netscape Navigator Help," Netscape Navigator Software User Documentation, Netscape Communications Corporation, http://home.netscape.com, XP-002166369, pp. 1-63 (Aug. 10, 1997).
Petit et al., "Bandwidth Resource Optimization in Video-On-Demand Network Architectures", Community Networking Integrated Multimedia Services to the Home, 1994, Proceedings of the 1st International Workshop on San Francisco, CA USA, Jul. 1994, New York, NY USA, IEEE, Jul. 1994, pp. 91-97, XP010124402 ISBN: 978-0-7803-2076-5.
Reid, Dixie, "Coming attractions before they hit the big screen, most films begin life as a trailer," The Sacramento Bee, Sacramento, California, p. E.1 (Jul. 18, 1996).
Remote Wonder, ATI, Tweak 3D, pp. 1-5 (Sep. 30, 2002).
Rottentomatoes web archived site, http://web.archive.org/web/20000301122211/http://rottentomatoes.com, Mar. 1, 2000, pp. 1-2.
"SezYou . . . origin of word daemon," Take Our Word for It, Issue 146, p. 4, http://www.takeourword.com/TOW146/page4.html, 4 pgs. (retrieved on Apr. 4, 2006).
VESA Plug and Display Standard, Version 1, Video Electronics Standards Association, XP-002123075, 90 pages (Jun. 11, 1997).
W3C, Putting language attributes in HTML, www.w3.org.org/International/O-help-lang, 2 pages (Apr. 29, 1997).
BPAI Decision for U.S. Appl. No. 09/693,288, mailed Nov. 28, 2007, 5 pages.
BPAI Decision for U.S. Appl. No. 09/692,995, mailed Aug. 20, 2008, 10 pages.
Canadian Office Action cited in Application No. 2,376,556 mailed Sep. 30, 2008, 4 pages.
Canadian Office Action cited in Application No. 2,376,556 mailed Nov. 23, 2007, 3 pages.
Canadian Office Action cited in Application No. 2,376,556 mailed Dec. 6, 2005, 5 pages.
Canadian Office Action cited in Application No. 2,402,088 mailed Jun. 1, 2010, 3 pages.
Canadian Office Action cited in Application No. 2,402,088 mailed May 30, 2006, 2 pages.
Canadian Office Action cited in Application No. 2,405,491 mailed Jun. 9, 2010, 5 pages.
Canadian Office Action cited in Application No. 2,405,491 mailed Apr. 3, 2009, 4 pages.
Canadian Office Action cited in Application No. 2,405,491 mailed May 22, 2008, 4 pages.
Canadian Office Action cited in Application No. 2,405,491 mailed Jun. 20, 2007, 4 pages.
Canadian Office Action cited in Application No. 2,405,491 mailed Jan. 20, 2006, 3 pages.
Canadian Office Action cited in Application No. 2,408,289 mailed Sep. 2, 2010, 3 pages.
Canadian Office Action cited in Application No. 2,408,289 mailed Aug. 27, 2008, 4 pages.
Canadian Office Action cited in Application No. 2,408,289 mailed May 30, 2006, 2 pages.
Canadian Office Action cited in Application No. 2,451,477 mailed Nov. 3, 2009, 6 pages.
Canadian Office Action cited in Application No. 2,456,318 mailed Nov. 17, 2010, 4 pages.
Canadian Office Action cited in Application No. 2,456,318 mailed May 5, 2008, 3 pages.
Canadian Office Action cited in Application No. 2,456,318 mailed Mar. 27, 2007, 2 pages.
Canadian Office Action cited in Application No. 2,459,334 mailed Mar. 4, 2011, 3 pages.
Canadian Office Action cited in Application No. 2,466,667 mailed Apr. 15, 2009, 3 pages.
Canadian Office Action cited in Application No. 2,459,334 mailed Apr. 16, 2009, 3 pages.
Canadian Office Action cited in Application No. 2,475,723 mailed Jul. 7, 2009, 3 pages.
Canadian Office Action cited in Application No. 2,554,208 mailed Apr. 1, 2010, 4 pages.
Canadian Office Action cited in Application No. 2,621,605 mailed Dec. 15, 2009, 6 pages.
Canadian Office Action cited in Application No. 2,451,477 mailed Oct. 20, 2010, 4 pages.
Decision on Appeal affirmed cited in U.S. Appl. No. 09/590,434 mailed May 28, 2008, 10 pages.
European Examination Report cited in Application No. 00 938 251.6 mailed Mar. 2, 2010, 8 pages.
European Examination Report cited in Application No. 00 938 251.6 mailed Nov. 2, 2007, 7 pages.
European Examination Report cited in Application No. 00 939 759.7 mailed May 10, 2007, 6 pages.
European Examination Report cited in Application No. 01 905 058.2 mailed Dec. 19, 2006, 5 pages.
European Examination Report cited in Application No. 01 922 261.1 mailed Jul. 18, 2008, 5 pages.
European Examination Report cited in Application No. 01 922 261.1 mailed Nov. 2, 2007, 3 pages.
European Examination Report cited in Application No. 01 922 261.1 mailed Jan. 24, 2007, 5 pages.
European Examination Report cited in Application No. 01 922 261.1 mailed May 26, 2006, 4 pages.
European Examination Report cited in Application No. 01 923 092.9 mailed Jul. 20, 2009, 6 pages.
European Examination Report cited in Application No. 01 923 092.9 mailed Nov. 27, 2008, 6 pages.
European Examination Report cited in Application No. 01 937 209.3 mailed Mar. 16, 2010, 3 pages.
European Examination Report cited in Application No. 01 937 209.3 mailed Jun. 23, 2008, 5 pages.
European Examination Report cited in Application No. 02 737 593.0 mailed May 6, 2009, 5 pages.
European Examination Report cited in Application No. 02 750 416.6 mailed Aug. 4, 2008, 3 pages.
European Examination Report cited in Application No. 02 750 416.6 mailed Aug. 28, 2007, 5 pages.
European Examination Report cited in Application No. 02 761 572.3 mailed Apr. 20, 2009, 5 pages.
European Examination Report cited in Application No. 02 761 572.3 mailed Sep. 22, 2008, 5 pages.
European Examination Report cited in Application No. 02 761 572.3 mailed Jan. 22, 2008, 4 pages.
European Examination Report cited in Application No. 02 761 572.3 mailed Aug. 29, 2007, 4 pages.
European Examination Report cited in Application No. 06 802 683.0 mailed Jun. 26, 2008, 3 pages.
Examiner's Answer to Appeal Brief cited in U.S. Appl. No. 09/590,488 mailed Jan. 11, 2008, 24 pages.
Japanese Office Action cited in Application No. 2001-581527 mailed Feb. 10, 2010, 7 pages.
Japanese Office Action cited in Application No. 2001-581527 mailed Sep. 8, 2009, 11 pages.
PCT Search Report cited in International Application No. PCT/US00/15952 mailed Jan. 16, 2001, 5 pages.

(56) References Cited

OTHER PUBLICATIONS

PCT Search Report cited in International Application No. PCT/US00/15963 mailed Sep. 1, 2000, 5 pages.
PCT Search Report cited in International Application No. PCT/US00/16000 mailed Oct. 2, 2000, 5 pages.
PCT Search Report cited in International Application No. PCT/US01/02490 mailed May 18, 2001, 6 pages.
PCT Search Report cited in International Application No. PCT/US01/06663 mailed Oct. 18, 2001, 5 pages.
PCT Search Report cited in International Application No. PCT/US01/10874 mailed Nov. 29, 2001, 5 pages.
PCT Search Report cited in International Application No. PCT/US01/14150 mailed Apr. 29, 2002, 7 pages.
PCT Search Report cited in International Application No. PCT/US02/20307 mailed Jan. 3, 2003, 4 pages.
PCT Search Report cited in International Application No. PCT/US02/20519 mailed Apr. 7, 2003, 5 pages.
PCT Search Report cited in International Application No. PCT/US02/24704 mailed Mar. 5, 2003, 4 pages.
PCT Search Report cited in International Application No. PCT/US02/28212 mailed Jan. 23, 2003, 4 pages.
PCT Search Report cited in International Application No. PCT/US02/36291 mailed May 23, 2003, 4 pages.
PCT Search Report cited in International Application No. PCT/US03/03391 mailed Jul. 14, 2003, 4 pages.
PCT Search Report and Written Opinion cited in International Application No. PCT/US2005/001812 mailed May 2, 2005, 15 pages.
PCT Search Report and Written Opinion cited in International Application No. PCT/US2006/033965 mailed Feb. 9, 2007, 15 pages.
PCT Written Opinion cited in International Application No. PCT/US00/15952 mailed Jul. 25, 2001, 4 pages.
PCT Written Opinion cited in International Application No. PCT/US00/15963 mailed Jun. 22, 2001, 3 pages.
PCT Written Opinion cited in International Application No. PCT/US00/16000 mailed Oct. 25, 2001, 4 pages.
PCT Written Opinion cited in International Application No. PCT/US01/02490 mailed Oct. 23, 2001, 3 pages.
PCT Written Opinion cited in International Application No. PCT/US01/06663 mailed Jan. 3, 2002, 6 pages.
PCT Written Opinion cited in International Application No. PCT/US01/10874 mailed Jun. 4, 2002, 4 pages.
PCT Written Opinion cited in International Application No. PCT/US01/14150 mailed Sep. 30, 2004, 6 pages.
PCT Written Opinion cited in International Application No. PCT/US02/20307 mailed Aug. 8, 2003, 5 pages.
PCT Written Opinion cited in International Application No. PCT/US02/20519 mailed Apr. 6, 2004, 7 pages.
PCT Written Opinion cited in International Application No. PCT/US02/24704 mailed Nov. 20, 2003, 4 pages.
PCT Written Opinion cited in International Application No. PCT/US02/28212 mailed Dec. 4, 2003, 4 pages.
Summons to attend oral proceedings in EP Application No. 01937209.3 mailed Mar. 21, 2011, 7 pages.
Reply Brief in U.S. Appl. No. 09/565,931 mailed on Sep. 17, 2007, 6 pages.
Summons to attend oral proceedings pursuant to Rule 115(1) EPC in European Application No. 02737593.0-1241 mailed May 28, 2010, 6 pages.
Supplementary European Search Report cited in European Application No. 02737593.0 mailed Mar. 3, 2009, 4 pages.
Supplementary European Search Report cited in European Application No. 02744705.1 mailed Feb. 19, 2010, 4 pages.
Supplementary European Search Report cited in European Application No. 02750416.6 mailed Jan. 2, 2007, 4 pages.
Supplementary European Search Report cited in European Application No. 02761572.3 mailed Mar. 20, 2007, 4 pages.
Supplementary European Search Report cited in European Application No. 02797096.1 mailed Oct. 14, 2005, 3 pages.
Supplementary European Search Report cited in European Application No. 03713364.2 mailed Jul. 6, 2005, 3 pages.
Canadian Office Action dated May 31, 2011 cited in Application No. 2,621,605, 2 pages.
Canadian Office Action dated Jul. 11, 2011 cited in Application No. 2,554,208, 4 pages.
European Office Action dated Oct. 10, 2011 cited in Application No. 02744705.1, 9 pages.
Canadian Office Action dated Oct. 17, 2011 cited in Application No. 2,402,088, 4 pages.
Summons to attend oral proceedings mailed Dec. 29, 2011 in Application No. 00939759.7, 9 pages.
Summons to attend oral proceedings mailed Jul. 31, 2012 in Application No. 02744705.1, 5 pages.
European Communication dated Nov. 14, 2012 in Application No. 09154377.7, 6 pages.
U.S. Non-Final Office Action cited in U.S. Appl. No. 09/518,041 mailed Mar. 18, 2003, 17 pages.
U.S. Non-Final Office Action cited in U.S. Appl. No. 09/591,356 mailed May 21, 2003, 20 pages.
U.S. Non-Final Office Action cited in U.S. Appl. No. 09/590,434 mailed May 23, 2003, 18 pages.
U.S. Non-Final Office Action cited in U.S. Appl. No. 09/590,488 mailed Jun. 10, 2003, 34 pages.
U.S. Final Office Action cited in U.S. Appl. No. 09/518,041 mailed Aug. 27, 2003, 16 pages.
U.S. Final Office Action cited in U.S. Appl. No. 09/591,356 mailed Sep. 26, 2003, 9 pages.
U.S. Non-Final Office Action cited in U.S. Appl. No. 09/693,115 mailed Sep. 26, 2003, 14 pages.
U.S. Non-Final Office Action cited in U.S. Appl. No. 09/693,288 mailed Oct. 27, 2003, 15 pages.
U.S. Non-Final Office Action cited in U.S. Appl. No. 09/881,516 mailed Oct. 28, 2003, 30 pages.
U.S. Non-Final Office Action cited in U.S. Appl. No. 09/692,995 mailed Dec. 5, 2003, 18 pages.
U.S. Final Office Action cited in U.S. Appl. No. 09/590,488 mailed Dec. 16, 2003, 9 pages.
U.S. Final Office Action cited in U.S. Appl. No. 09/590,434 mailed Dec. 18, 2003, 14 pages.
U.S. Non-Final Office Action cited in U.S. Appl. No. 09/591,356 mailed Jan. 14, 2004, 9 pages.
U.S. Final Office Action cited in U.S. Appl. No. 09/693,115 mailed Feb. 9, 2004, 20 pages.
U.S. Non-Final Office Action cited in U.S. Appl. No. 09/518,041 mailed Feb. 11, 2004, 16 pages.
U.S. Final Office Action cited in U.S. Appl. No. 09/693,288 mailed Feb. 26, 2004, 13 pages.
U.S. Non-Final Office Action cited in U.S. Appl. No. 09/542,484 mailed Apr. 1, 2004, 14 pages.
U.S. Final Office Action cited in U.S. Appl. No. 09/881,516 mailed Apr. 21, 2004, 34 pages.
U.S. Non-Final Office Action cited in U.S. Appl. No. 09/590,434 mailed Apr. 22, 2004, 12 pages.
U.S. Final Office Action cited in U.S. Appl. No. 09/692,995 mailed Apr. 26, 2004, 24 pages.
U.S. Final Office Action cited in U.S. Appl. No. 09/591,356 mailed May 10, 2004, 13 pages.
U.S. Non-Final Office Action cited in U.S. Appl. No. 09/590,904 mailed Jun. 4, 2004, 20 pages.
U.S. Final Office Action cited in U.S. Appl. No. 09/590,488 mailed Jun. 7, 2004, 14 pages.
U.S. Non-Final Office Action cited in U.S. Appl. No. 09/693,115 mailed Jun. 16, 2004, 15 pages.
U.S. Non-Final Office Action cited in U.S. Appl. No. 09/693,288 mailed Jul. 15, 2004, 16 pages.
U.S. Non-Final Office Action cited in U.S. Appl. No. 09/881,516 mailed Jul. 26, 2004, 36 pages.
U.S. Non-Final Office Action cited in U.S. Appl. No. 09/565,931 mailed Sep. 10, 2004, 22 pages.
U.S. Non-Final Office Action cited in U.S. Appl. No. 09/693,790 mailed Oct. 6, 2004, 19 pages.
U.S. Final Office Action cited in U.S. Appl. No. 09/518,041 mailed Oct. 20, 2004, 25 pages.

(56) References Cited

OTHER PUBLICATIONS

U.S. Non-Final Office Action cited in U.S. Appl. No. 09/692,995 mailed Oct. 21, 2004, 28 pages.
U.S. Non-Final Office Action cited in U.S. Appl. No. 09/590,488 mailed Nov. 16, 2004, 9 pages.
U.S. Non-Final Office Action cited in U.S. Appl. No. 09/692,920 mailed Nov. 18, 2004, 13 pages.
U.S. Office Action cited in U.S. Appl. No. 09/693,784 mailed Dec. 1, 2004, 8 pages.
U.S. Non-Final Office Action cited in U.S. Appl. No. 09/881,516 mailed Dec. 29, 2004, 30 pages.
U.S. Non-Final Office Action cited in U.S. Appl. No. 10/778,494 mailed Dec. 29, 2004, 11 pages.
U.S. Final Office Action cited in U.S. Appl. No. 09/590,904 mailed Jan. 11, 2005, 13 pages.
U.S. Final Office Action cited in U.S. Appl. No. 09/693,115 mailed Jan. 25, 2005, 18 pages.
U.S. Final Office Action cited in U.S. Appl. No. 09/693,288 mailed Feb. 10, 2005, 9 pages.
U.S. Final Office Action cited in U.S. Appl. No. 09/542,484 mailed Mar. 22, 2005, 21 pages.
U.S. Non-Final Office Action cited in U.S. Appl. No. 09/518,041 mailed Apr. 22, 2005, 12 pages.
U.S. Final Office Action cited in U.S. Appl. No. 09/692,995 mailed May 3, 2005, 33 pages.
U.S. Office Action cited in U.S. Appl. No. 10/073,842 mailed Jun. 1, 2005, 10 pgs.
U.S. Final Office Action cited in U.S. Appl. No. 09/881,516 mailed Jun. 3, 2005, 41 pages.
U.S. Final Office Action cited in U.S. Appl. No. 09/692,920 mailed Jun. 17, 2005, 22 pages.
U.S. Final Office Action cited in U.S. Appl. No. 09/693,790 mailed Jun. 21, 2005, 25 pages.
U.S. Non-Final Office Action cited in U.S. Appl. No. 09/896,231 mailed Jun. 23, 2005, all pages.
U.S. Final Office Action cited in U.S. Appl. No. 09/590,488 mailed Jun. 30, 2005, 15 pages.
U.S. Final Office Action cited in U.S. Appl. No. 09/591,356 mailed Jun. 30, 2005, 21 pages.
U.S. Final Office Action cited in U.S. Appl. No. 09/565,931 mailed Jul. 1, 2005, 18 pages.
U.S. Non-Final Office Action cited in U.S. Appl. No. 09/590,904 mailed Jul. 13, 2005, 14 pages.
U.S. Non-Final Office Action cited in U.S. Appl. No. 09/693,288 mailed Jul. 19, 2005, 17 pages.
U.S. Non-Final Office Action cited in U.S. Appl. No. 09/542,484 mailed Jul. 28, 2005, 22 pages.
U.S. Non-Final Office Action cited in U.S. Appl. No. 10/994,599 mailed Aug. 23, 2005, 15 pages.
U.S. Final Office Action cited in U.S. Appl. No. 09/518,041 mailed Sep. 15, 2005, 13 pages.
U.S. Final Office Action cited in U.S. Appl. No. 09/692,995 mailed Sep. 21, 2005, 28 pages.
U.S. Non-Final Office Action cited in U.S. Appl. No. 09/590,434 mailed Nov. 21, 2005, 20 pages.
U.S. Final Office Action cited in U.S. Appl. No. 09/693,288 mailed Dec. 1, 2005, 18 pages.
U.S. Non-Final Office Action cited in U.S. Appl. No. 09/590,488 mailed Dec. 20, 2005, 15 pages.
U.S. Non-Final Office Action cited in U.S. Appl. No. 09/591,356 mailed Dec. 20, 2005, 16 pages.
U.S. Non-Final Office Action cited in U.S. Appl. No. 09/693,790 mailed Dec. 28, 2005, 18 pages.
U.S. Final Office Action cited in U.S. Appl. No. 09/896,231 mailed Dec. 29, 2005, 30 pages.
U.S. Non-Final Office Action cited in U.S. Appl. No. 09/565,931 mailed Jan. 11, 2006, 25 pages.
U.S. Final Office Action cited in U.S. Appl. No. 09/590,904 mailed Jan. 24, 2006, 15 pages.
U.S. Final Office Action cited in U.S. Appl. No. 10/994,599 mailed Jan. 26, 2006, 12 pages.
U.S. Non-Final Office Action cited in U.S. Appl. No. 09/692,920 mailed Feb. 16, 2006, 26 pages.
U.S. Non-Final Office Action cited in U.S. Appl. No. 09/924,111 mailed Mar. 15, 2006, 13 pages.
U.S. Final Office Action cited in U.S. Appl. No. 09/542,484 mailed Mar. 21, 2006, 26 pages.
U.S. Non-Final Office Action cited in U.S. Appl. No. 09/692,995 mailed Mar. 27, 2006, 19 pages.
U.S. Non-Final Office Action cited in U.S. Appl. No. 09/518,041 mailed Apr. 4, 2006, 13 pages.
U.S. Final Office Action cited in U.S. Appl. No. 09/591,356 mailed Apr. 13, 2006, 15 pages.
U.S. Final Office Action cited in U.S. Appl. No. 09/590,434 mailed May 11, 2006, 17 pages.
U.S. Non-Final Office Action cited in U.S. Appl. No. 10/994,599 mailed May 16, 2006, 13 pages.
U.S. Non-Final Office Action cited in U.S. Appl. No. 09/590,904 mailed May 31, 2006, 17 pages.
U.S. Final Office Action cited in U.S. Appl. No. 09/565,931 mailed Jun. 15, 2006, 16 pages.
U.S. Final Office Action cited in U.S. Appl. No. 09/693,790 mailed Jun. 16, 2006, 21 pages.
U.S. Final Office Action cited in U.S. Appl. No. 09/692,920 mailed Jun. 21, 2006, 25 pages.
U.S. Final Office Action cited in U.S. Appl. No. 09/590,488 mailed Jul. 10, 2006, 15 pages.
U.S. Final Office Action cited in U.S. Appl. No. 09/518,041 mailed Aug. 28, 2006, 15 pages.
U.S. Final Office Action cited in U.S. Appl. No. 10/778,494 mailed Aug. 28, 2006, 15 pages.
U.S. Non-Final Office Action cited in U.S. Appl. No. 09/542,484 mailed Sep. 7, 2006, 23 pages.
U.S. Final Office Action cited in U.S. Appl. No. 09/692,995 mailed Sep. 8, 2006, 15 pages.
U.S. Non-Final Office Action cited in U.S. Appl. No. 10/934,253 mailed Sep. 14, 2006, 9 pages.
U.S. Final Office Action cited in U.S. Appl. No. 09/924,111 mailed Sep. 18, 2006, 14 pages.
U.S. Non-Final Office Action cited in U.S. Appl. No. 09/590,488 mailed Oct. 26, 2006, 15 pages.
U.S. Office Action cited in U.S. Appl. No. 10/008,429 mailed Oct. 31, 2006, 25 pgs.
U.S. Final Office Action cited in U.S. Appl. No. 09/590,904 mailed Nov. 15, 2006, 15 pages.
U.S. Non-Final Office Action cited in U.S. Appl. No. 09/692,920 mailed Nov. 24, 2006, 24 pages.
U.S. Final Office Action cited in U.S. Appl. No. 10/994,599 mailed Dec. 1, 2006, 15 pages.
U.S. Non-Final Office Action cited in U.S. Appl. No. 09/693,790 mailed Dec. 28, 2006, 10 pages.
U.S. Non-Final Office Action cited in U.S. Appl. No. 10/761,777 mailed Jan. 24, 2007, 20 pages.
U.S. Non-Final Office Action cited in U.S. Appl. No. 10/778,494 mailed Feb. 2, 2007, 14 pages.
U.S. Non-Final Office Action cited in U.S. Appl. No. 09/518,041 mailed Feb. 6, 2007, 15 pages.
U.S. Non-Final Office Action cited in U.S. Appl. No. 10/934,253 mailed Feb. 9, 2007, 7 pages.
U.S. Final Office Action cited in U.S. Appl. No. 09/590,488 mailed Feb. 27, 2007, 17 pages.
U.S. Non-Final Office Action cited in U.S. Appl. No. 09/542,484 mailed Mar. 12, 2007, 17 pages.
U.S. Non-Final Office Action cited in U.S. Appl. No. 09/590,904 mailed Mar. 26, 2007, 17 pages.
U.S. Final Office Action cited in U.S. Appl. No. 10/778,494 mailed May 22, 2007, 15 pages.
U.S. Non-Final Office Action cited in U.S. Appl. No. 09/924,111 mailed Apr. 19, 2007, 9 pages.
U.S. Final Office Action cited in U.S. Appl. No. 09/693,790 mailed Jun. 19, 2007, 12 pages.

(56) References Cited

OTHER PUBLICATIONS

U.S. Final Office Action cited in U.S. Appl. No. 09/692,920 mailed Jun. 14, 2007, 25 pages.
U.S. Non-Final Office Action cited in U.S. Appl. No. 10/761,777 mailed Jul. 18, 2007, 22 pages.
U.S. Final Office Action cited in U.S. Appl. No. 10/934,253 mailed Jul. 24, 2007, 8 pages.
U.S. Non-Final Office Action cited in U.S. Appl. No. 09/894,508 mailed Jul. 26, 2007, 6 pages.
U.S. Final Office Action cited in U.S. Appl. No. 09/518,041 mailed Aug. 24, 2007, 14 pages.
U.S. Final Office Action cited in U.S. Appl. No. 09/590,904 mailed Sep. 13, 2007, 11 pages.
U.S. Non-Final Office Action cited in U.S. Appl. No. 10/740,138 mailed Oct. 2, 2007, 16 pages.
U.S. Final Office Action cited in U.S. Appl. No. 09/924,111 mailed Oct. 5, 2007, 9 pages.
U.S. Non-Final Office Action cited in U.S. Appl. No. 09/542,484 mailed Dec. 7, 2007, 20 pages.
U.S. Final Office Action cited in U.S. Appl. No. 09/894,508 mailed Dec. 31, 2007, 8 pages.
U.S. Non-Final Office Action cited in U.S. Appl. No. 10/981,053 mailed Jan. 2, 2008, 16 pages.
U.S. Non-Final Office Action cited in U.S. Appl. No. 09/518,041 mailed Jan. 10, 2008, 9 pages.
U.S. Non-Final Office Action cited in U.S. Appl. No. 09/693,790 mailed Jan. 15, 2008, 11 pages.
U.S. Non-Final Office Action cited in U.S. Appl. No. 10/778,494 mailed Jan. 16, 2008, 14 pages.
U.S. Non-Final Office Action cited in U.S. Appl. No. 09/692,920 mailed Jan. 17, 2008, 44 pages.
U.S. Non-Final Office Action cited in U.S. Appl. No. 09/924,111 mailed Jan. 29, 2008, 8 pages.
U.S. Non-Final Office Action cited in U.S. Appl. No. 10/783,235 mailed Feb. 25, 2008, 10 pages.
U.S. Non-Final Office Action cited in U.S. Appl. No. 10/957,849 mailed Apr. 30, 2008, 12 pages.
U.S. Non-Final Office Action cited in U.S. Appl. No. 10/957,854 mailed Apr. 30, 2008, 10 pages.
U.S. Non-Final Office Action cited in U.S. Appl. No. 10/957,942 mailed May 1, 2008, 11 pages.
U.S. Final Office Action cited in U.S. Appl. No. 10/740,138 mailed Jun. 11, 2008, 17 pages.
U.S. Non-Final Office Action cited in U.S. Appl. No. 11/208,387 mailed Jun. 12, 2008, 20 pages.
U.S. Non-Final Office Action cited in U.S. Appl. No. 09/894,508 mailed Jun. 13, 2008, 7 pages.
U.S. Final Office Action cited in U.S. Appl. No. 09/542,484 mailed Jun. 17, 2008, 21 pages.
U.S. Non-Final Office Action cited in U.S. Appl. No. 10/934,253 mailed Jun. 17, 2008, 9 pages.
U.S. Non-Final Office Action cited in U.S. Appl. No. 09/947,890 mailed Jun. 25, 2008, 17 pages.
U.S. Final Office Action cited in U.S. Appl. No. 09/518,041 mailed Jul. 7, 2008, 10 pages.
U.S. Final Office Action cited in U.S. Appl. No. 09/692,920 mailed Jul. 22, 2008, 17 pages.
U.S. Final Office Action cited in U.S. Appl. No. 09/693,790 mailed Jul. 25, 2008, 15 pages.
U.S. Final Office Action cited in U.S. Appl. No. 10/778,494 mailed Jul. 25, 2008, 15 pages.
U.S. Final Office Action cited in U.S. Appl. No. 10/957,942 mailed Jul. 31, 2008, 13 pages.
U.S. Final Office Action cited in U.S. Appl. No. 10/981,053 mailed Aug. 6, 2008, 16 pages.
U.S. Final Office Action cited in U.S. Appl. No. 09/924,111 mailed Aug. 7, 2008, 8 pages.
U.S. Final Office Action cited in U.S. Appl. No. 10/957,849 mailed Aug. 8, 2008, 9 pages.
U.S. Non-Final Office Action cited in U.S. Appl. No. 10/740,138 mailed Sep. 15, 2008, 21 pages.
U.S. Non-Final Office Action cited in U.S. Appl. No. 11/460,516 mailed Sep. 17, 2008, 14 pages.
U.S. Non-Final Office Action cited in U.S. Appl. No. 11/496,303 mailed Sep. 18, 2008, 14 pages.
U.S. Non-Final Office Action cited in U.S. Appl. No. 11/244,621 mailed Sep. 19, 2008, 11 pages.
U.S. Non-Final Office Action cited in U.S. Appl. No. 11/275,245 mailed Sep. 22, 2008, 22 pages.
U.S. Final Office Action cited in U.S. Appl. No. 10/783,235 mailed Oct. 2, 2008, 6 pages.
U.S. Non-Final Office Action cited in U.S. Appl. No. 10/957,854 mailed Oct. 15, 2008, 12 pages.
U.S. Non-Final Office Action cited in U.S. Appl. No. 11/162,345 mailed Oct. 31, 2008, 44 pages.
U.S. Final Office Action cited in U.S. Appl. No. 09/947,890 mailed Nov. 6, 2008, 16 pages.
U.S. Non-Final Office Action cited in U.S. Appl. No. 11/170,348 mailed Dec. 11, 2008, 22 pages.
U.S. Final Office Action cited in U.S. Appl. No. 10/761,777 mailed Dec. 19, 2008, 16 pages.
U.S. Final Office Action cited in U.S. Appl. No. 11/208,387 mailed Dec. 22, 2008, 19 pages.
U.S. Non-Final Office Action cited in U.S. Appl. No. 09/896,231 mailed Dec. 23, 2008, 17 pages.
U.S. Final Office Action cited in U.S. Appl. No. 10/934,253 mailed Dec. 26, 2008, 9 pages.
U.S. Non-Final Office Action cited in U.S. Appl. No. 10/957,942 mailed Jan. 14, 2009, 13 pages.
U.S. Non-Final Office Action cited in U.S. Appl. No. 09/692,995 mailed Jan. 23, 2009, 20 pages.
U.S. Non-Final Office Action cited in U.S. Appl. No. 09/894,508 mailed Feb. 4, 2009, 11 pages.
U.S. Non-Final Office Action cited in U.S. Appl. No. 09/565,931 mailed Feb. 13, 2009, 13 pages.
U.S. Final Office Action cited in U.S. Appl. No. 11/460,516 mailed Feb. 13, 2009, 18 pages.
U.S. Final Office Action cited in U.S. Appl. No. 11/162,345 mailed Mar. 9, 2009, 37 pages.
U.S. Final Office Action cited in U.S. Appl. No. 10/740,138 mailed Mar. 19, 2009, 25 pages.
U.S. Non-Final Office Action cited in U.S. Appl. No. 11/244,621 mailed Mar. 19, 2009, 13 pages.
U.S. Final Office Action cited in U.S. Appl. No. 11/496,303 mailed Apr. 1, 2009, 16 pages.
U.S. Final Office Action cited in U.S. Appl. No. 10/957,854 mailed Apr. 7, 2009, 9 pages.
U.S. Non-Final Office Action cited in U.S. Appl. No. 09/947,890 mailed Apr. 10, 2009, 14 pages.
U.S. Non-Final Office Action cited in U.S. Appl. No. 10/981,053 mailed Apr. 15, 2009, 16 pages.
U.S. Non-Final Office Action cited in U.S. Appl. No. 12/127,968 mailed Apr. 30, 2009, 17 pages.
U.S. Final Office Action cited in U.S. Appl. No. 11/170,348 mailed May 28, 2009, 10 pages.
U.S. Final Office Action cited in U.S. Appl. No. 09/896,231 mailed Jun. 3, 2009, 21 pages.
U.S. Non-Final Office Action cited in U.S. Appl. No. 10/761,777 mailed Jun. 11, 2009, 19 pages.
U.S. Non-Final Office Action cited in U.S. Appl. No. 10/934,253 mailed Jun. 26, 2009, 9 pages.
U.S. Non-Final Office Action cited in U.S. Appl. No. 11/460,516 mailed Jun. 26, 2009, 19 pages.
U.S. Final Office Action cited in U.S. Appl. No. 09/565,931 mailed Jul. 14, 2009, 18 pages.
U.S. Final Office Action cited in U.S. Appl. No. 10/957,942 mailed Jul. 28, 2009, 14 pages.
U.S. Final Office Action cited in U.S. Appl. No. 11/275,245 mailed Jul. 29, 2009, 16 pages.
U.S. Non-Final Office Action cited in U.S. Appl. No. 11/162,345 mailed Aug. 21, 2009, 39 pages.

(56) References Cited

OTHER PUBLICATIONS

U.S. Non-Final Office Action cited in U.S. Appl. No. 11/564,431 mailed Aug. 24, 2009, 16 pages.
U.S. Non-Final Office Action cited in U.S. Appl. No. 10/740,138 mailed Sep. 3, 2009, 25 pages.
U.S. Final Office Action cited in U.S. Appl. No. 09/692,995 mailed Sep. 4, 2009, 25 pages.
U.S. Final Office Action cited in U.S. Appl. No. 09/894,508 mailed Sep. 17, 2009, 12 pages.
U.S. Final Office Action cited in U.S. Appl. No. 11/244,621 mailed Sep. 17, 2009, 10 pages.
U.S. Non-Final Office Action cited in U.S. Appl. No. 10/957,854 mailed Sep. 28, 2009, 15 pages.
U.S. Non-Final Office Action cited in U.S. Appl. No. 11/496,303 mailed Sep. 29, 2009, 18 pages.
U.S. Non-Final Office Action cited in U.S. Appl. No. 11/170,348 mailed Sep. 30, 2009, 10 pages.
U.S. Non-Final Office Action cited in U.S. Appl. No. 12/372,887 mailed Oct. 16, 2009, 21 pages.
U.S. Non-Final Office Action cited in U.S. Appl. No. 11/275,245 mailed Oct. 22, 2009, 16 pages.
U.S. Non-Final Office Action cited in U.S. Appl. No. 12/372,917 mailed Oct. 26, 2009, 18 pages.
U.S. Non-Final Office Action cited in U.S. Appl. No. 12/372,894 mailed Oct. 27, 2009, 6 pages.
U.S. Non-Final Office Action cited in U.S. Appl. No. 09/565,931 mailed Oct. 28, 2009, 20 pages.
U.S. Non-Final Office Action cited in U.S. Appl. No. 12/389,564 mailed Nov. 10, 2009, 14 pages.
U.S. Non-Final Office Action cited in U.S. Appl. No. 09/896,231 mailed Nov. 17, 2009, 21 pages.
U.S. Final Office Action cited in U.S. Appl. No. 09/947,890 mailed Nov. 24, 2009, 15 pages.
U.S. Non-Final Office Action cited in U.S. Appl. No. 12/413,686 mailed Nov. 30, 2009, 14 pages.
U.S. Final Office Action cited in U.S. Appl. No. 12/127,968 mailed Dec. 1, 2009, 14 pages.
U.S. Non-Final Office Action cited in U.S. Appl. No. 12/388,139 mailed Dec. 15, 2009, 24 pages.
U.S. Non-Final Office Action cited in U.S. Appl. No. 11/678,653 mailed Dec. 16, 2009, 25 pages.
U.S. Final Office Action cited in U.S. Appl. No. 10/934,253 mailed Dec. 23, 2009, 10 pages.
U.S. Non-Final Office Action cited in U.S. Appl. No. 12/179,752 mailed Dec. 23, 2009, 13 pages.
U.S. Final Office Action cited in U.S. Appl. No. 11/564,431 mailed Jan. 4, 2010, 17 pages.
U.S. Final Office Action cited in U.S. Appl. No. 10/740,138 mailed Jan. 15, 2010, 26 pages.
U.S. Non-Final Office Action cited in U.S. Appl. No. 10/761,777 mailed Jan. 21, 2010, 21 pages.
U.S. Final Office Action cited in U.S. Appl. No. 10/981,053 mailed Jan. 21, 2010, 20 pages.
U.S. Non-Final Office Action cited in U.S. Appl. No. 12/179,767 mailed Jan. 22, 2010, 30 pages.
U.S. Final Office Action cited in U.S. Appl. No. 11/170,348 mailed Feb. 1, 2010, 12 pages.
U.S. Non-Final Office Action cited in U.S. Appl. No. 11/244,621 mailed Feb. 5, 2010, 12 pages.
U.S. Non-Final Office Action cited in U.S. Appl. No. 11/496,303 mailed Mar. 2, 2010, 16 pages.
U.S. Final Office Action cited in U.S. Appl. No. 11/162,345 mailed Mar. 16, 2010, 27 pages.
U.S. Final Office Action cited in U.S. Appl. No. 11/460,516 mailed Mar. 18, 2010, 18 pages.
U.S. Non-Final Office Action cited in U.S. Appl. No. 11/238,369 mailed Mar. 30, 2010, 13 pages.
U.S. Non-Final Office Action cited in U.S. Appl. No. 12/127,968 mailed Mar. 31, 2010, 15 pages.
U.S. Final Office Action cited in U.S. Appl. No. 10/957,854 mailed Apr. 1, 2010, 19 pages.
U.S. Final Office Action cited in U.S. Appl. No. 12/372,887 mailed Apr. 14, 2010, 27 pages.
U.S. Non-Final Office Action cited in U.S. Appl. No. 10/934,253 mailed Apr. 27, 2010, 10 pages.
U.S. Final Office Action cited in U.S. Appl. No. 12/389,564 mailed Apr. 28, 2010, 10 pages.
U.S. Non-Final Office Action cited in U.S. Appl. No. 11/275,245 mailed May 5, 2010, 21 pages.
U.S. Final Office Action cited in U.S. Appl. No. 12/372,917 mailed May 17, 2010, 19 pages.
U.S. Final Office Action cited in U.S. Appl. No. 09/896,231 mailed May 28, 2010, 21 pages.
U.S. Non-Final Office Action cited in U.S. Appl. No. 12/389,128 mailed Jun. 2, 2010, 14 pages.
U.S. Non-Final Office Action cited in U.S. Appl. No. 11/963,942 mailed Jun. 8, 2010, 20 pp. (60374.0053USD3).
U.S. Final Office Action cited in U.S. Appl. No. 12/413,686 mailed Jun. 10, 2010, 18 pages.
U.S. Non-Final Office Action cited in U.S. Appl. No. 09/693,288 mailed Jun. 21, 2010, 22 pages.
U.S. Non-Final Office Action cited in U.S. Appl. No. 12/180,416 mailed Jun. 25, 2010, 11 pages.
U.S. Final Office Action cited in U.S. Appl. No. 11/678,653 mailed Jun. 23, 2010, 28 pages.
U.S. Non-Final Office Action cited in U.S. Appl. No. 10/957,942 mailed Jun. 30, 2010, 22 pages.
U.S. Final Office Action cited in U.S. Appl. No. 12/388,139 mailed Jul. 6, 2010, 23 pages.
U.S. Non-Final Office Action cited in U.S. Appl. No. 11/963,945 mailed Jul. 16, 2010, 16 pages.
U.S. Non-Final Office Action cited in U.S. Appl. No. 11/564,431 mailed Jul. 20, 2010, 17 pages.
U.S. Final Office Action cited in U.S. Appl. No. 11/496,303 mailed Jul. 22, 2010, 22 pages.
U.S. Final Office Action cited in U.S. Appl. No. 10/761,777 mailed Aug. 2, 2010, 22 pages.
U.S. Non-Final Office Action cited in U.S. Appl. No. 11/963,951 mailed Aug. 2, 2010, 15 pages.
U.S. Final Office Action cited in U.S. Appl. No. 11/244,621 mailed Aug. 18, 2010, 15 pages.
U.S. Final Office Action cited in U.S. Appl. No. 12/179,767 mailed Aug. 20, 2010, 27 pages.
U.S. Non-Final Office Action cited in U.S. Appl. No. 12/389,564 mailed Aug. 23, 2010, 16 pages.
U.S. Final Office Action cited in U.S. Appl. No. 11/238,369 mailed Aug. 31, 2010, 18 pages.
U.S. Non-Final Office Action cited in U.S. Appl. No. 12/388,002 mailed Sep. 3, 2010, 18 pages.
U.S. Non-Final Office Action cited in U.S. Appl. No. 11/234,967 mailed Sep. 10, 2010, 10 pages.
U.S. Final Office Action cited in U.S. Appl. No. 12/127,968 mailed Sep. 14, 2010, 24 pages.
U.S. Non-Final Office Action cited in U.S. Appl. No. 12/390,418 mailed Sep. 28, 2010, 13 pages.
U.S. Non-Final Office Action cited in U.S. Appl. No. 12/390,420 mailed Oct. 19, 2010, 12 pages.
U.S. Non-Final Office Action cited in U.S. Appl. No. 12/390,422 mailed Oct. 20, 2010, 13 pages.
U.S. Non-Final Office Action cited in U.S. Appl. No. 11/170,348 mailed Oct. 26, 2010, 13 pages.
U.S. Non-Final Office Action cited in U.S. Appl. No. 10/740,138 mailed Oct. 27, 2010, 23 pages.
U.S. Non-Final Office Action cited in U.S. Appl. No. 10/934,253 mailed Nov. 4, 2010, 10 pages.
U.S. Final Office Action cited in U.S. Appl. No. 12/389,128 mailed Nov. 9, 2010, 50 pages.
U.S. Non-Final Office Action cited in U.S. Appl. No. 12/179,763 mailed Jan. 4, 2011, 18 pages.
U.S. Non-Final Office Action cited in U.S. Appl. No. 12/389,564 mailed Jan. 21, 2011, 13 pages.

(56) References Cited

OTHER PUBLICATIONS

U.S. Non-Final Office Action cited in U.S. Appl. No. 11/162,345 mailed Feb. 1, 2011, 33 pages.
U.S. Final Office Action cited in U.S. Appl. No. 09/693,288 mailed Feb. 8, 2011, 28 pages.
U.S. Non-Final Office Action cited in U.S. Appl. No. 12/413,686 mailed Mar. 17, 2011, 20 pages.
U.S. Non-Final Office Action cited in U.S. Appl. No. 10/761,777 mailed Apr. 12, 2011, 20 pages.
U.S. Non-Final Office Action cited in U.S. Appl. No. 10/934,253 mailed Apr. 29, 2011, 11 pages.
U.S. Final Office Action cited in U.S. Appl. No. 12/389,564 mailed May 19, 2011, 15 pages.
U.S. Non-Final Office Action cited in U.S. Appl. No. 10/740,138 mailed Jun. 8, 2011, 26 pages.
U.S. Final Office Action cited in U.S. Appl. No. 11/170,348 mailed Jun. 9, 2011, 14 pages.
U.S. Final Office Action mailed Jul. 19, 2011 in U.S. Appl. No. 11/162,345, 31 pgs.
Board of Patent Appeals and Interferences Decision mailed Aug. 8, 2011 in U.S. Appl. No. 09/518,041, 9 pgs.
U.S. Non-Final Office Action mailed Sep. 6, 2011 in U.S. Appl. No. 11/238,369, 22 pgs.
U.S Non-Final Office Action mailed Sep. 13, 2011 in U.S. Appl. No. 12/389,564, 16 pgs.
U.S. Non-Final Office Action mailed Sep. 27, 2011 in U.S. Appl. No. 12/413,686, 24 pgs.
U.S. Final Office Action mailed Nov. 10, 2011 in U.S. Appl. No. 10/934,253, 14 pgs.
U.S. Final Office Action mailed Jan. 24, 2012 in U.S. Appl. No. 11/238,369, 19 pgs.
U.S. Final Office Action mailed Apr. 16, 2012 in U.S. Appl. No. 12/413,686, 21 pgs.
U.S. Final Office Action mailed May 14, 2012 in U.S. Appl. No. 11/238,369, 16 pgs.
U.S. Appl. No. 12/372,952, filed Feb. 18, 2009 entitled "System and Method for Assessing Usage of Purchasable Enhancements of Television Services".
U.S. Appl. No. 12/388,002, filed Feb. 18, 2009 entitled "System and Method for Providing Purchasable Enhancements of VOD Services".
U.S. Appl. No. 12/372,776, filed Feb. 18, 2009 entitled "Configurable Options for Accessible On-Demand Information".
U.S. Appl. No. 12/388,139, filed Feb. 18, 2009 entitled "Upgrading Access of Television Program Information with Optional Features".
U.S. Appl. No. 12/372,803, filed Feb. 18, 2009 entitled "Management of Generic Service Enhancements for Television Services".
U.S. Appl. No. 10/780,448, filed Feb. 13, 2004 entitled "System and Method for Expiration Reminders of Rentable Media Offerings".
U.S. Appl. No. 09/494,209 filed Jan. 1, 2000 entitled "System and Method for Allowing a User to Quickly Navigate Within a Program Guide to an Established Point".
U.S. Appl. No. 09/502,067 filed Feb. 10, 2000 entitled "Method and System for Identification of Pay-per-View Programming".
U.S. Appl. No. 09/590,520, filed Jun. 9, 2000 entitled "Video on Deman System with Parameter-Controlled Bandwidth Deallocation".
U.S. Appl. No. 09/590,518 filed Jun. 9, 2000 entitled "Catalog Management System for Video on Demand System".
U.S. Appl. No. 09/693,784 filed Oct. 20, 2000 entitled "System and Method for Reminders of Upcoming Rentable Media Offerings".
U.S. Appl. No. 09/693,780 filed Oct. 20, 2000 entitled "Sychronized Video-On-Demand Supplemental Commentary".
U.S. Appl. No. 09/896,390 filed Jun. 29, 2001 entitled "System and Method for Archiving Multiple Downloaded Recordable Media Content".
U.S. Appl. No. 09/896,331 filed Jun. 29, 2001 entitled "Method and Apparatus for Recordable Media Content Distribution".
U.S. Appl. No. 14/166,460 filed Jan. 28, 2014 entitled "System and Method for Characterization of Purchasable and Recordable Media (PRM)".
U.S. Appl. No. 10/008,429 filed Nov. 13, 2001 entitled "Graphic User Interface Alternate Download Options for Unavailable PRM Content".
U.S. Appl. No. 13/438,511 filed Apr. 3, 2012 entitled "Determining Device That Performs Processing of Output Pictures ".
Almeroth et al.; An Alternative Paradigm for Scalable On-Demand Applications: Evaluating and Deploying the Interactive multimedia Jukebox; 1999; I EEE; vol. 11; p. 658-672.
Law Office Computing, AportisDoc Mobile Edition 2.2, retrieved on Aug. 14, 2008 at http://www.lawofficecomputing.com/old_site/Reviewsdata/djO 1/aportisdoc.asp, 2 pgs.
Perlman et al.; a working Anti-Taping System for Cable Pay-Per-View; Aug. 1998; IEEE; vol. 35; 6 pgs.
Rousseau, "Synchronized Multimedia for the WWW.," retrieved from http://www7.wwwconference.org/1833/com1833.htm on November 21, 2013, 15 pages.
Wikipedia, Moxi, retrieved on Aug. 14, 2008 at http://en.wikipedia.orglwiki/Moxi, 8 pgs.
BPAI Decision for U.S. Appl. No. 09/896,231, mailed Nov. 6, 2007, 17 pgs.
Canadian Office Action mailed Apr. 11, 2013 in Application No. 2,402,088, 7 pages.
Canadian Office Action mailed Oct. 17, 2013 in Application No. 2,451,477, 3 pages.
U.S. Office Action cited in U.S. Appl. No. 09/590,521 mailed Apr. 9, 2001, 15 pgs.
U.S. Office Action cited in U.S. Appl. No. 09/590,521 mailed Oct. 24, 2001, 19 pgs.
U.S. Office Action cited in U.S. Appl. No. 09/590,521 mailed May 23, 2002, 19 pgs.
U.S. Office Action cited in U.S. Appl. No. 09/590,521 mailed Aug. 28, 2002, 11 pgs.
U.S. Office Action cited in U.S. Appl. No. 09/590,521 mailed Feb. 26, 2003, 17 pgs.
U.S. Office Action cited in U.S. Appl. No. 10/073,842 mailed Jun. 25, 2003, 16 pgs.
U.S. Office Action cited in U.S. Appl. No. 09/590,521 mailed Aug. 6, 2003, 19 pgs.
U.S. Office Action cited in U.S. Appl. No. 09/590,518 mailed Sep. 9, 2003, 10 pgs.
U.S. Office Action cited in U.S. Appl. No. 09/693,780 mailed Sep. 13, 2003, 16 pgs.
U.S. Office Action cited in U.S. Appl. No. 09/693,784 mailed Sep. 25, 2003, 9 pgs.
U.S. Office Action cited in U.S. Appl. No. 10/073,842 mailed Dec. 24, 2003, 9 pgs.
U.S. Office Action cited in U.S. Appl. No. 09/693,780 mailed Jan. 9, 2004, 10 pgs.
U.S. Office Action cited in U.S. Appl. No. 09/590,521 mailed Jan. 21, 2004, 12 pgs.
U.S. Office Action cited in U.S. Appl. No. 09/590,518 mailed Mar. 11, 2004, 11 pgs.
U.S. Office Action cited in U.S. Appl. No. 09/693,780 mailed May 6, 2004, 16 pgs.
U.S. Office Action cited in U.S. Appl. No. 09/709,145 mailed Jul. 20, 2004, 14 pgs.
U.S. Office Action cited in U.S. Appl. No. 10/073,842 mailed Aug. 2, 2004, 10 pgs.
U.S. Office Action cited in U.S. Appl. No. 09/590,518 mailed Sep. 23, 2004, 14 pgs.
U.S. Office Action cited in U.S. Appl. No. 09/693,784 mailed Dec. 1, 2004, 8 pgs.
U.S. Office Action cited in U.S. Appl. No. 10/780,448 mailed Dec. 29, 2004, 9 pgs.
U.S. Office Action cited in U.S. Appl. No. 09/590,520 mailed Mar. 11, 2005, 11 pgs.
U.S. Office Action cited in U.S. Appl. No. 09/590,518 mailed Mar. 14, 2005, 15 pgs.
U.S. Office Action cited in U.S. Appl. No. 09/693,780 mailed Apr. 20, 2005, 20 pgs.
U.S. Office Action cited in U.S. Appl. No. 09/709,145 mailed Apr. 22, 2005, 21 pgs.

(56) References Cited

OTHER PUBLICATIONS

U.S. Office Action cited in U.S. Appl. No. 10/780,448 mailed May 3, 2005, 7 pgs.
U.S. Office Action mailed Nov. 10, 2014 in U.S. Appl. No. 13/482,497, 73 pages.
U.S. Office Action mailed Nov. 20, 2014 in U.S. Appl. No. 14/294,624, 99 pages.
U.S. Office Action cited in U.S. Appl. No. 09/896,390 mailed Jun. 15, 2005, 7 pgs.
U.S. Office Action cited in U.S. Appl. No. 09/693,784 mailed Aug. 12, 2005, 15 pgs.
U.S. Office Action cited in U.S. Appl. No. 09/896,470 mailed Aug. 25, 2005, 21 pgs.
U.S. Office Action cited in U.S. Appl. No. 10/780,448 mailed Oct. 13, 2005, 9 pgs.
U.S. Office Action cited in U.S. Appl. No. 09/896,390 mailed Oct. 19, 2005, 15 pgs.
U.S. Office Action cited in U.S. Appl. No. 09/709,145 mailed Nov. 2, 2005, 26 pgs.
U.S. Office Action cited in U.S. Appl. No. 09/693,780 mailed Dec. 19, 2005, 17 pgs.
U.S. Office Action cited in U.S. Appl. No. 09/896,470 mailed Feb. 1, 2006, 15 pgs.
U.S. Office Action cited in U.S. Appl. No. 09/896,390 mailed Feb. 8, 2006, 14 pgs.
U.S. Office Action cited in U.S. Appl. No. 10/008,429 mailed Apr. 4, 2006, 18 pgs.
U.S. Office Action cited in U.S. Appl. No. 09/693,780 mailed Apr. 5, 2006, 25 pgs.
U.S. Office Action cited in U.S. Appl. No. 10/073,842 mailed May 2, 2006, 9 pgs.
U.S. Office Action cited in U.S. Appl. No. 09/693,780 mailed Jul. 7, 2006, 18 pgs.
U.S. Office Action cited in U.S. Appl. No. 09/709,145 mailed Jul. 28, 2006, 25 pgs.
U.S. Office Action cited in U.S. Appl. No. 09/590,518 mailed Aug. 14, 2006, 10 pgs.
U.S. Office Action cited in U.S. Appl. No. 10/073,842 mailed Sep. 5, 2006, 10 pgs.
U.S. Office Action cited in U.S. Appl. No. 09/896,470 mailed Sep. 6, 2006, 11 pgs.
U.S. Office Action cited in U.S. Appl. No. 09/896,390 mailed Oct. 23, 2006, 20 pgs.
U.S. Office Action cited in U.S. Appl. No. 09/709,145 mailed Jan. 12, 2007, 27 pgs.
U.S. Office Action cited in U.S. Appl. No. 09/896,470 mailed Feb. 27, 2007, 14 pgs.
U.S. Office Action cited in U.S. Appl. No. 10/073,842 mailed Mar. 9, 2007, 10 pgs.
U.S. Office Action cited in U.S. Appl. No. 10/008,429 mailed May 3, 2007, 22 pgs.
U.S. Office Action cited in U.S. Appl. No. 09/896,390 mailed May 21, 2007, 16 pgs.
U.S. Office Action cited in U.S. Appl. No. 09/590,518 mailed Jun. 26, 2007, 11 pgs.
U.S. Office Action cited in U.S. Appl. No. 10/683,138 mailed Jul. 5, 2007, 10 pgs.
U.S. Office Action cited in U.S. Appl. No. 09/896,470 mailed Jul. 30, 2007, 17 pgs.
U.S. Office Action cited in U.S. Appl. No. 09/896,390 mailed Nov. 5, 2007, 14 pgs.
U.S. Office Action cited in U.S. Appl. No. 10/008,429 mailed Dec. 5, 2007, 23 pgs.
U.S. Office Action cited in U.S. Appl. No. 09/590,518 mailed Dec. 14, 2007, 11 pgs.
U.S. Office Action cited in U.S. Appl. No. 10/683,138 mailed Dec. 28, 2007, 10 pgs.
U.S. Office Action cited in U.S. Appl. No. 09/896,390 mailed Apr. 9, 2008, 17 pgs.
U.S. Office Action cited in U.S. Appl. No. 09/896,470 mailed Apr. 18, 2008, 14 pgs.
U.S. Office Action cited in U.S. Appl. No. 09/590,518 mailed Jul. 23, 2008, 11 pgs.
U.S. Office Action cited in U.S. Appl. No. 10/683,138 mailed Aug. 7, 2008, 10 pgs.
U.S. Office Action cited in U.S. Appl. No. 10/683,138 mailed Jan. 21, 2009 10 pgs.
U.S. Office Action cited in U.S. Appl. No. 09/590,518 mailed Jan. 23, 2009, 11 pgs.
U.S. Office Action cited in U.S. Appl. No. 10/683,138 mailed Jul. 6, 2009, 11 pgs.
U.S. Office Action cited in U.S. Appl. No. 12/372,898 mailed Oct. 27, 2009, 8 pgs.
U.S. Office Action cited in U.S. Appl. No. 12/372,905 mailed Oct. 27, 2009, 6 pgs.
U.S. Office Action cited in U.S. Appl. No. 10/683,138 mailed Jan. 27, 2010, 11 pgs.
U.S. Non-Final Office Action mailed May 30, 2012 in U.S. Appl. No. 10/740,138, 27 pgs.
U.S. Non-Final Office Action mailed Dec. 26, 2012 in U.S. Appl. No. 12/413,686, 9 pages.
U.S. Final Office Action mailed Apr. 19, 2013 in U.S. Appl. No. 10/740,138, 31 pages.
U.S. Non-Final Office Action mailed Jun. 5, 2013 in U.S. Appl. No. 11/678,653, 50 pages.
U.S. Non-Final Office Action mailed Jun. 19, 2013 in U.S. Appl. No. 10/934,253, 14 pages.
U.S. Final Office Action mailed Jun. 25, 2013 in U.S. Appl. No. 12/413,686, 10 pages.
U.S. Office Action mailed Feb. 26, 2014 in U.S. Appl. No. 13/482,689, 26 pages.
U.S. Office Action mailed Apr. 16, 2014 in U.S. Appl. No. 13/482,497, 16 pages.
U.S. Office Action mailed Nov. 27, 2015 in U.S. Appl. No. 14/294,624, 11 pages.
U.S. Office Action mailed Jan. 4, 2016 in U.S. Appl. No. 13/482,497, 22 pages.
U.S. Office Action mailed Feb. 1, 2016 in U.S. Appl. No. 13/438,511, 91 pages.
U.S. Office Action mailed Feb. 25, 2015 in U.S. Appl. No. 13/482,497, 20 pages.
U.S. Office Action mailed Aug. 14, 2015 in U.S. Appl. No. 14/294,624, 20 pages.
U.S. Final Office Action dated Apr. 4, 2016 in U.S. Appl. No. 14/294,624, 29 pgs.

\* cited by examiner

HYPERTEXT SERVICE GUIDE MENU DISPLAY

CROSS-REFERENCE TO RELATED APPLICATIONS

This application is a continuation of U.S. patent application Ser. No. 13/596,689, filed on Aug. 28, 2012 (now U.S. Pat. No. 8,739,212, Issued May 27, 2014), which is a continuation of U.S. patent application Ser. No. 10/957,849, filed on Oct. 4, 2004 (now U.S. Pat. No. 8,255,951, Issued Aug. 28, 2012), which is a divisional of U.S. patent application Ser. No. 09/565,931, filed on May 4, 2000 (now U.S. Pat. No. 7,934,232, Issued Apr. 26, 2011), each of which are incorporated by reference herein in their entirety.

FIELD OF THE INVENTION

This invention relates in general to the field of television systems, and more particularly, to a user interface for accessing services in television systems.

BACKGROUND

Historically, television services have been comprised of analog broadcast audio and video signals. Cable television systems now receive broadcasts and retransmit them with other programming to users over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the settop box, has become an important computing device for accessing video services and navigating a subscriber through a maze of services available. In addition to supporting traditional analog broadcast video functionality, digital HCTs (or "DHCTs") now also support an increasing number of services that are not analog, but rather digital; are not basic broadcast, but rather two-way communication such as video-on-demand; and are not basic video, such as e-mail or web browsers. These are all in addition to the host of other television services that are increasingly being demanded by consumers, examples of which include audio and audio/visual programming, advanced navigation controls, impulse pay-per-view technology, and on-line commerce. In addition to the interactive services, the increased bandwidth available through a digital television system has made it possible for a subscriber to have access to hundreds, or even thousands, of channels and/or services. Thus, in order to provide these more powerful and complex features, the simple conventional channel abstractions need to be extended beyond those that have traditionally been provided.

Each HCT or DHCT (collectively hereinafter "DHCT") is typically connected to a cable or satellite television network. The DHCTs generally include hardware and software necessary to provide the functionality of the digital television system at the client's site. Preferably, some of the software executed by a DHCT is downloaded and/or updated via the cable television network. Each DHCT typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

Because many separate services may be offered by a single cable television service provider to each individual subscriber, including television viewing channels as well as other applications, there is a need for the DHCT to not only be able to provide each service or application that the cable television system provider offers but also be able to flexibly control access to services that are denoted as premium services. As system operators of cable television systems continue to add services and applications, a problem exists in both making the subscriber aware of and also in providing quick access to the new services and channels. Because of the large number of viewing options presented to a subscriber, a problem also exists in providing the subscriber a quick and efficient method to access the most popular or commonly viewed services.

SUMMARY OF THE INVENTION

Briefly described, the preferred embodiment of the present invention provides a method and system for accessing services in a television system. In one implementation, a DHCT presents a subscriber a menu containing a plurality of selectable link representations corresponding to separate services or applications offered by the cable television system. The subscriber navigates the menu with a remote device and selects a desired service for viewing by choosing the selectable link representation corresponding to the desired service or application. The DHCT receives the user input, translates the selectable link command into an executable call, and activates the service or application corresponding to the selected link from the menu chosen by the subscriber.

Many objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
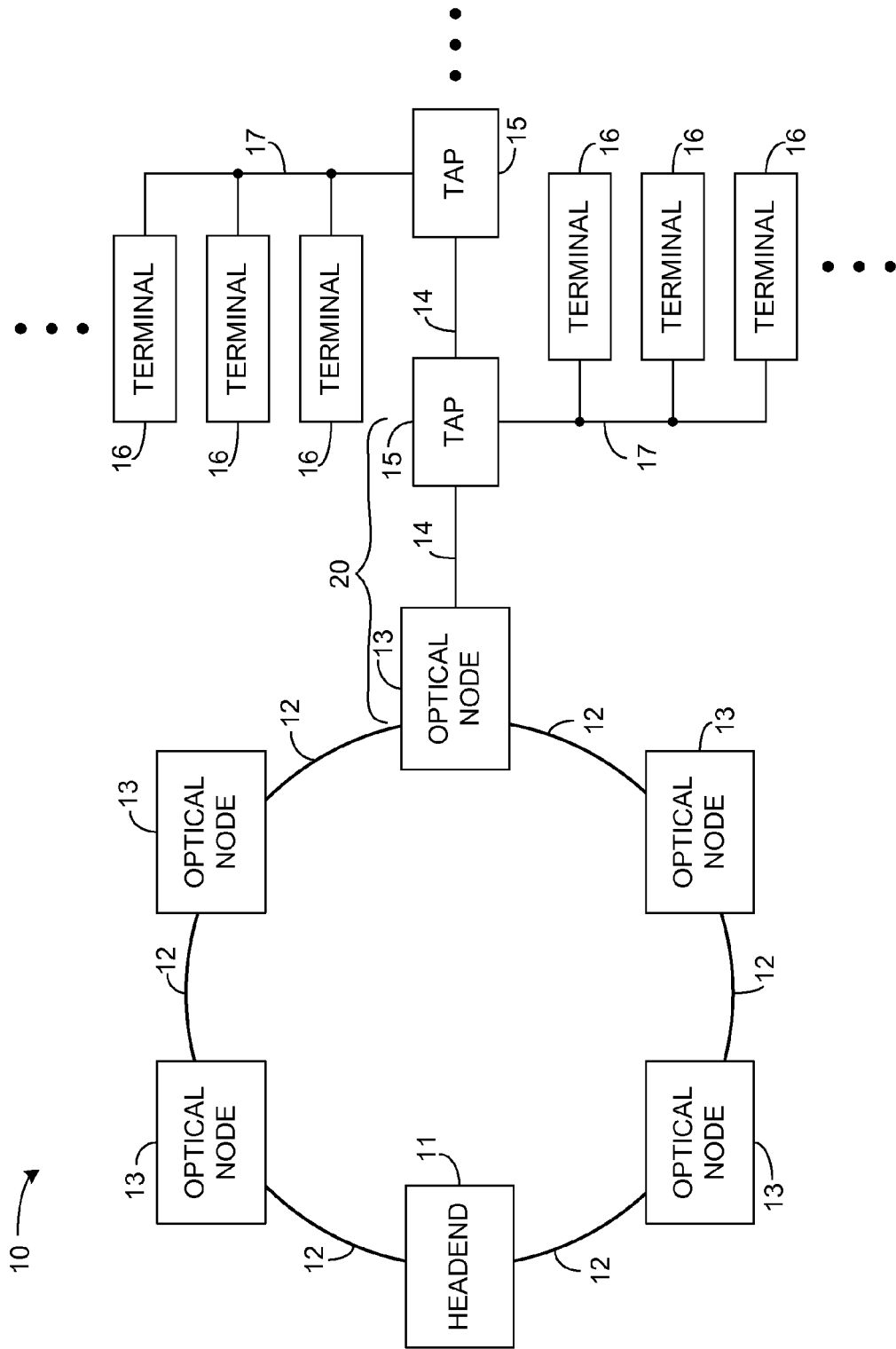
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 20 to multiple DHCTs 16.

Figure 2:
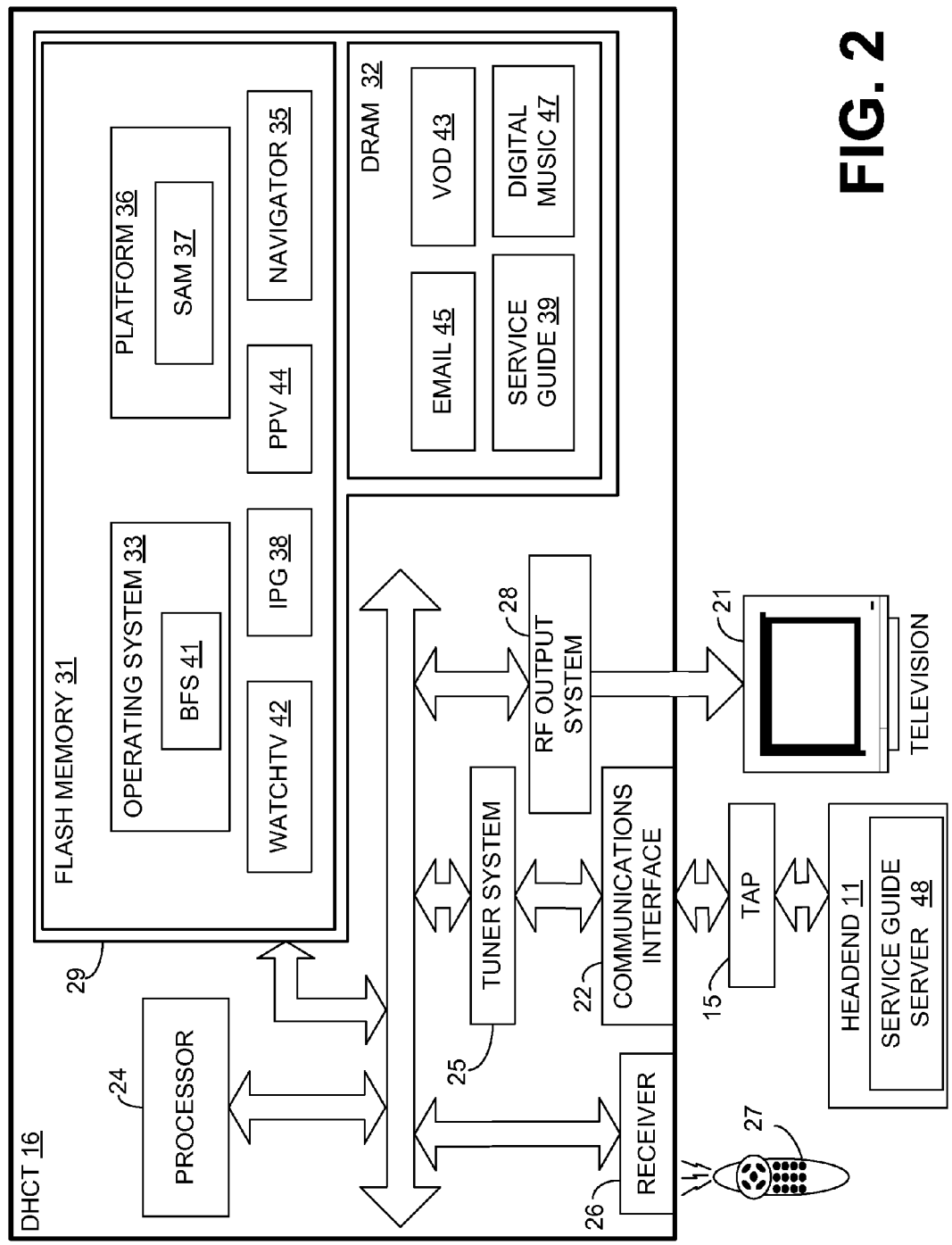
FIG. 2 is a block diagram of a DHCT with components and applications shown in various memories with related equipment in accordance with the preferred embodiment of present invention depicted in FIG. 1.

FIG. 2 is a block diagram illustrating the DHCT 16 and other system equipment. The DHCT 16 is typically situated within the residence or business of a subscriber. It may be integrated into a device that has a display 21, such as a television set, or it may be a stand-alone unit that couples to an external display 21, such as a display included with a computer or a television, and that processes media transported in television signals for presentation or playback to a subscriber (user of the DHCT). The DHCT 16 preferably comprises a communications interface 22 for receiving the RF signals, which can include media such as video, audio, graphical and data information, from the tap 15 and for providing any reverse information to the tap 15 for transmission back to the headend 11 (FIG. 1). The DHCT 16 further includes a processor 24 for controlling operations of the DHCT 16, including a video output port such as an RF output system 28 for driving the display 21, a tuner system 25 for tuning into a particular television channel to be displayed and for sending and receiving data corresponding to various types of media from the headend 11. The tuner system includes in one implementation, an out-of-band tuner for bi-directional quadrature phase shift keying (QPSK) data communication and a quadrature amplitude modulation (QAM) tuner for receiving television signals. Additionally, DHCT 16 includes a receiver 26 for receiving externally-generated information, such as user inputs or commands for other devices. The DHCT 16 may also include one or more wireless or wired communication interfaces, also called ports, for receiving and/or transmitting data to other devices. For instance, the DHCT may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device 27 or keyboard that includes user-actuated buttons.

In one implementation, a memory portion 29 of the DHCT 16 includes flash memory 31 and dynamic random access memory (DRAM) 32 for storing the executable programs and related data components of various applications and modules for execution by the DHCT 16. Both the flash memory 31 and the DRAM memory 32 are coupled to the processor 24 for storing configuration data and operational parameters, such as commands that are recognized by the processor 24.

Basic functionality of the DHCT 16 is provided by an operating system 33 that is contained in flash memory 31. One or more programmed software applications, herein referred to as applications, are executed by utilizing the computing resources in the DHCT 16. The application executable program stored in flash memory 31 or DRAM memory 32 is executed by processor 24 (e.g., a central processing unit or digital signal processor) under the auspices of the operating system 33. Data required as input by the application program is stored in DRAM memory 32 and read by processor 24 from DRAM memory 32 as need be during the course of application program execution. Input data may be data stored in DRAM memory 32 by a secondary application or other source, either internal or external to the DHCT 16, or possibly anticipated by the application and thus created with the application program at the time it was generated as a software application program, in which case it is stored in flash memory 31. Data may be received via any of the communication ports of the DHCT 16, from the headend 11 via the DHCT's network interface (i.e., the QAM or out-of-band tuners) or as user input via receiver 26. A type of input data fulfills and serves the purpose of parameters as described below. Data generated by application program is stored in DRAM memory 32 by processor 24 during the course of application program execution.

The flash memory 31 also contains a platform library 36. The platform library 36 is a collection of functionality useful to applications, such as a Timer Manager, Compression Manager, Database Manager, Widget Toolkit, String Managers, and other utilities (not shown). These utilities are accessed by applications as necessary so that each application does not have to contain these utilities thus resulting in memory consumption savings and a consistent user interface.

A Service Application Manager (SAM) provides a model in which the user can access services available on the system. A service consists of an application to run and a parameter, such as data content, specific to that service. The SAM handles the lifecycle of the applications on the system, including the definition, initiation, activation, suspension and deletion of services they provide and the downloading of the application into the DHCT 16 as necessary. Many services can be defined using the same application component, with different parameters. The SAM includes a SAM server (not shown) in headend 11 and a SAM client 37 in the DHCT 16. The SAM client 37 (hereinafter referred to as SAM 37) is a part of the platform 36. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID.

An application client is the portion of an application that executes on the DHCT 16 and provides the application's services to the user typically through a graphical user interface. Also contained in flash memory 31 is a navigator application 35 that provides a navigation framework for the user to access services available on the cable system. Examples of the services include, in one implementation, watching television and pay-per-view events, listening to digital music, and an interactive program guide, each of which is controlled through separate applications in flash memory 31. The navigator 35 also allows users to access various settings of the DHCT 16, including volume, parental control, VCR commands, etc.

Interactive program guide (IPG) 38, Watch TV 42, and pay-per-view (PPV) 44 are all resident applications in flash memory 31. The IPG 38 displays a program guide to the user and populates the guide with program data for selection. Watch TV 42 enables a user to simply "watch television" while PPV 44 enables viewing of premium television services. These applications, because they are in flash memory 31, are available to the user and do not need to be downloaded each time the DHCT 16 initializes.

The applications that are stored in the DRAM 32 may be applications that are loaded when the DHCT 16 initializes or are applications that are downloaded to the DHCT 16 upon a user-initiated command using an input device such as the remote 27. In this non-limiting example, as shown in FIG. 2, DRAM 32 contains the following application clients (hereinafter referred to as "application(s)"): a video-on-demand application (VOD) 43, an e-mail application 45, a digital music application 47. Additionally, DRAM 32 could also contain a calendar application (not shown) and a calculator application (not shown). It should be obvious to one with ordinary skill in the art that these applications are not limiting and merely serve as examples for this present embodiment of the invention.

The applications shown in FIG. 2 and all others provided by the cable system operator are top level software entities on the network for providing services to the user. In one implementation, all applications executing on the DHCT 16 work with the navigator 35 by abiding by several guidelines. First, an application must utilize and implement the SAM 37 for provisioning, activation, and suspension of services. Second, an application must share DHCT 16 resources with other applications and abide by the resource management policies of the SAM 37, the operating system 33, and the DHCT 16. Third, an application must handle all situations where resources are unavailable without navigator 35 intervention. Fourth, when an application loses service authorization while providing a service, an application should suspend the service gracefully. The navigator 35 will reactivate an individual service application when it later becomes authorized. Finally, an application must be configured so it does not respond to input commands reserved for the navigator. For instance, as a non-limiting example, when user input commands are entered via a wireless remote control device or keyboard, the application must be configured so it does not have access to certain user input keys that are reserved by the navigator 35 (i.e., power, channel +/−, volume +/−, etc.). However, without any limitations to the aforementioned, in certain circumstances certain applications during the course of program execution may reach a machine-state in which input keys that would ordinarily be reserved may be employed for input by the application but only during that particular machine-state. For instance, an application may display a user interface that specifically requests input or selection from the user in which one or more of the reserved keys are used momentarily during that machine-state.

Other forms of entering input commands, such as voice-activated commands in a DHCT 16 with an input communication port that receives signals from a wired or wireless microphone and circuitry to process and compare digitized speech signals, would be subject to similar configuration so that DHCT 16 does not respond to input commands reserved for the navigator 35. In this alternate embodiment, the audio input port (not shown) in the DHCT 16 is a single receiver device. Additionally, the DHCT 16 has digital signal processing capability that implements a subtraction filter to effect subtraction of the audio generated by the DHCT 16 from the speech signal received from the user.

Another application shown in FIG. 2 that is contained in DRAM 32 is the service guide application client 39 (hereinafter referred to as "service guide 39"). The service guide 39 consists of a graphical user interface to create a hypertext markup language (HTML) file (or other middleware markup languages such as one created via XML (Extensible Markup Language)). The service guide 39 may be customized remotely by the system operator by editing the generated HTML file or by using a graphical HTML editor. The service guide 39 uses an HTML display engine and parser (not shown) to parse the HTML file and render the service guide display to the user. Depending on the embodiment, the HTML engine may be part of the service guide 39 or extended by the operating system 33 or platform 36, or some combination of both. The service guide 39 receives input commands generated by a user via an input device, such as a remote control device 27 (FIGS. 2 & 6), and received by an input communication port 26 (FIG. 2) in DHCT 16. A service selection may be effected by navigating (moving the highlight "cursor") through the service guide display by manipulating designated buttons of a wired or wireless remote device or keyboard 27 or electronic mouse (not shown). The selection of a service or entry from the service guide 39 HTML display invokes HTML commands, which are received by the service guide 39 and translated into one or more application executable calls that are executed by the navigator 35 and the SAM 37 in activating the desired service. Any of a multiplicity of services may be activated through the service guide 39 and its corresponding interface (discussed below), including any native application to the DHCT 16, any downloadable application supported by the cable television provider at the headend 11, any Internet web content, or any other information source provided through the cable television system 10.

References to the selection of a service or entry from the multiplicity of services and/or entries displayed by the service guide 39 on display 21 comprise the process of interactively navigating by moving the highlight cursor and transmitting input commands to DHCT 16. The processor 24 processes data extracted and/or interpreted from the input commands to effect visual cursor position and visual feedback of the user's selection on the display 21. When the user inputs a selection, the processor 24 invokes communication between internal components in the DHCT 16, including software components such as the navigator 35 and SAM 37, to activate the selected service. The processor 24 employs the messaging services of the operating system 33 to effect the communication between any two or more of the internal components.

Figure 3:
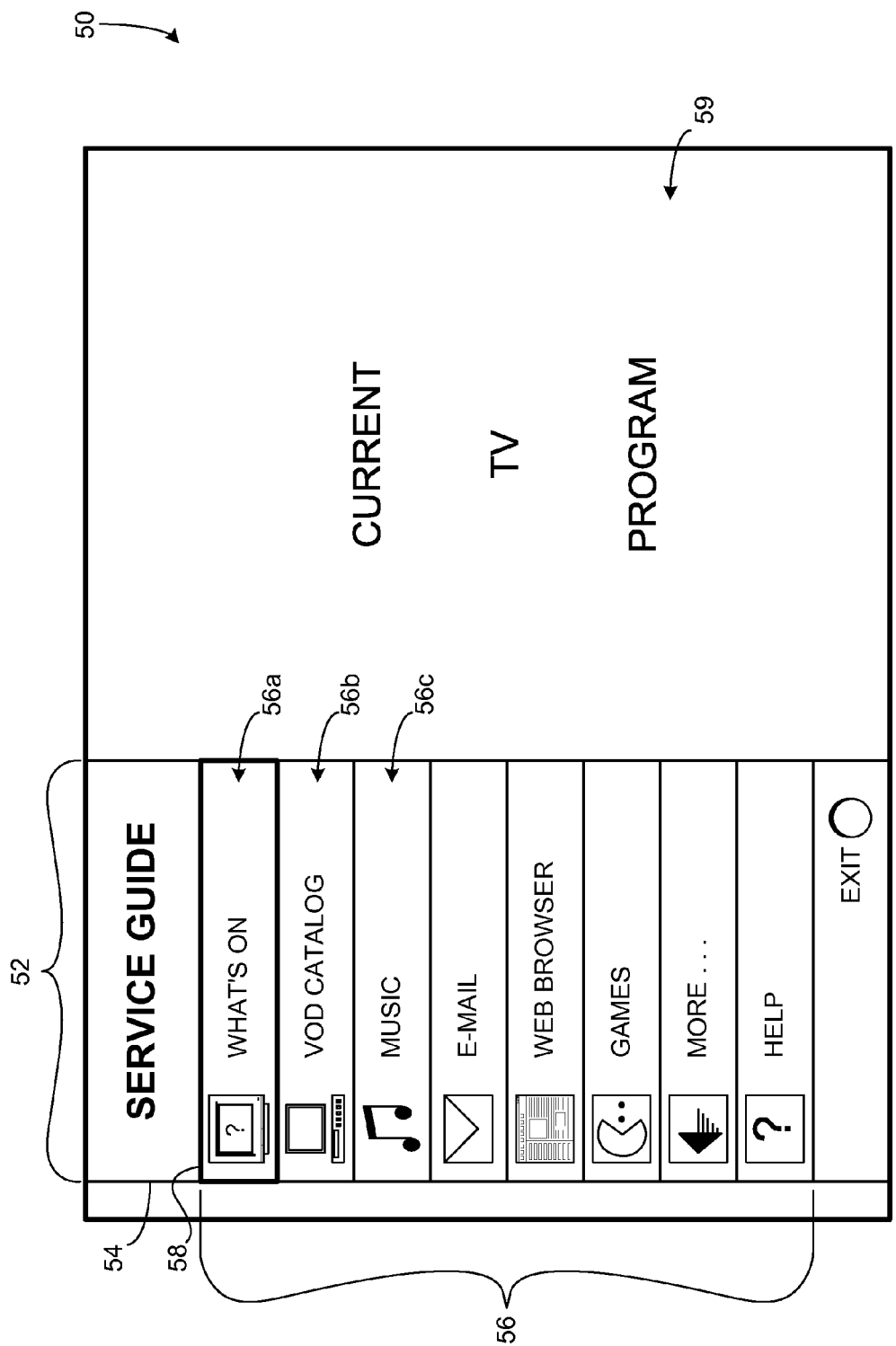
FIG. 3 is a diagram of the service guide presented to the user by the DHCT in FIG. 2 upon activation of the service guide application.
Figure 4:
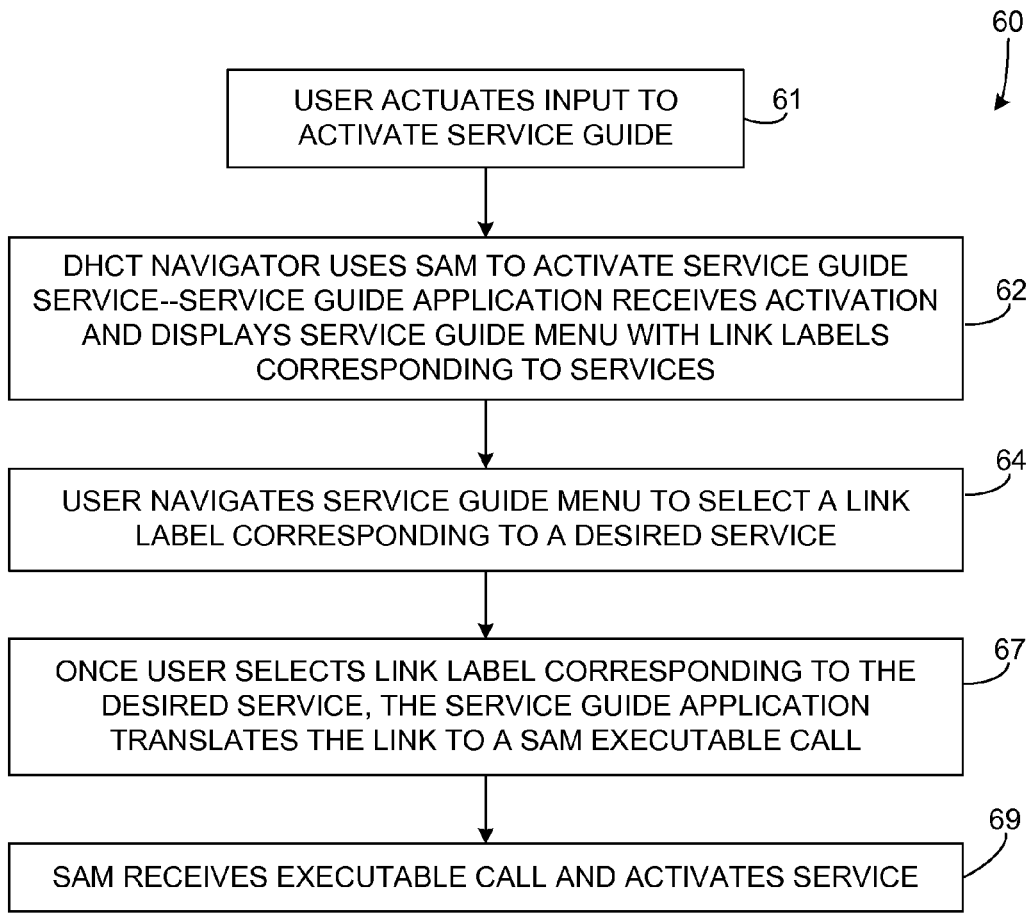
FIG. 4 is a flowchart of the process of presenting the service guide menu as depicted in FIG. 3 and activating the chosen service or application corresponding to the selected link in the service guide menu.

FIG. 3 is a diagram of the display 50 with the service guide menu 52 presented to the user by the DHCT 16 depicted in FIG. 2. With additional reference to the flowchart 60 shown in FIG. 4, the service guide menu 52 is presented upon activation of the service guide 39 (FIG. 2), as depicted in step 61 and as described above. Upon activation of the service guide 39, a navigable menu 52 is presented to the user as shown in FIG. 3 and depicted in step 62 as shown in FIG. 4. In this embodiment, the HTML display includes an identification string 54 indicating that the pop-up menu 52 is the service guide. The HTML display also includes a series of icons and text strings that are each selectable hyper-text link labels 56 organized in a vertically oriented list of services for the user to navigate (by moving the cursor) with the remote device 21. A footer includes a text string and graphical image instructing the user how to exit the service guide menu 52.

One of the selectable link labels 56 is highlighted to visually identify the current cursor position 58 so that the user can enact cursor navigation functionality and move among the selectable link labels 56, as shown in step 64 (FIG. 4). Once the user, via the remote 21 or other input device, selects one of the selectable link labels 56, the service guide 39 translates the associated HTML hyper-text link destination information for the selected link label 56 to an executable call for the navigator 35 or the SAM 37, as shown in step 67 (FIG. 4). The SAM 37 implements the service request by executing and activating the desired application to provide the service corresponding to the selected selectable link label 56, as shown in step 69 (FIG. 4).

In the preferred embodiment, the selectable link labels 56 are written in a customized version of the middleware markup language HTML. The selectable link label 56 is only one type of link representation that may be displayed to the user by the DHCT 16. Moreover, a link label 56 may be displayed as text only, text plus an icon, or an icon only. The selectable link labels 56 are rendered based upon HTML (or XML) hyperlink definitions. Therefore, the link definitions are comprised of an anchor <A> to define the start and destination of the hypertext link definition, and the text between the start and an end tag defines the label for the link definition. The label can include graphics defined with IMG or OBJECT elements. One example link definition expressed in HTML includes the following syntax: <A HREF="tv:// destination_service"><IMG SRC="graphic_icon">text label</A>. In this example, "tv://destination_service" is the destination definition (also referred to herein as a destination address, destination reference, service reference, or universal resource locator (URL)) and "<IMG SRC="graphic_icon">text label" is the label definition (also referred to herein as one type of link representation definition or label reference). Also in this example, the label definition includes an IMG element and text, both of which will be used to generate visual representations that are selectable by the user. The IMG element further defines the location of the image file, as a URL.

A system operator at the headend 11 uses a service guide server 48 (FIG. 2) to configure the service guide display 52 depicted in FIG. 3. The system operator may construct the selectable link labels by writing the customized HTML code necessary to construct the service guide menu 52. An alternative embodiment provides a graphical interface in the service guide server 48 (FIG. 2) to enable a system operator to graphically create the service guide menu 52 that is implemented by the DHCTs 16. From a multiplicity of services available on the cable system and shown in the graphical interface, the operator chooses and organizes into a list the services to be offered by the service guide 39 for all the DHCTs 16 in the network 20.

In an alternate embodiment, a user customizes his/her service guide display 52 by calling a telephone number that guides the user through a series of automated voice menus. The user enters account information and a personal identification number received from the cable service company and uses a brochure as a reference to make selections through an automated phone menu system.

In another alternate embodiment, the user accesses the Internet through a computer, PC, DHCT 16, or similar device and logs on to a specified secure and encrypted web site facilitated by the cable service company to select the set of services that the user desires in the service guide display. The user enters account information and a password or personal identification number to navigate through a set of menus and make customized selections that are routed from a secured web site to the service guide server 48.

In another alternate embodiment, the user configures the service guide menu 52 similarly in an interactive fashion by navigating through a series of menus generated by a configuration application (not shown) running in the DHCT 16 and presented on display 21. The user can re-customize his/her service guide preferences in the future by calling the automated phone menu system, logging on to the specified secure and encrypted web site, or through the configuration application running in the DHCT 16. Regardless of which method is utilized to create the service guide menu 52 in the service guide server 48, the information is communicated to the service guide client 39 executing on each DHCT 16 in the network 20 for display to the user.

The service guide 39, in the preferred embodiment, is communicated to the DHCT 16 when the DHCT 16 initializes as part of a power up sequence, but, in alternative embodiments, the service guide 39 could be a resident application in the DHCT 16 or could be downloaded to the DHCT 16 upon command by the user. The service guide client executable 39 is received from a broadcast file system (BFS) carousel that continually broadcasts it and the service guide HTML file(s) 52 across the network. This BFS system (not shown) provides a mechanism for delivering various types of media or data from a group of servers to a BFS client 41 in the operating system 33 for each DHCT 16. This data can contain practically any type of information. Applications on both the server and the client can access the data via the BFS in a similar manner to a file system found on disk operating systems. In an alternative embodiment, the HTML file(s) are retrieved via HTTP from the service guide server 48.

The service guide menu 52 (FIG. 3), as stated above, is comprised of multiple selectable link labels 56 that activate services and are, in the preferred embodiment, expressed in a customized version of HTML. In utilizing customized HTML (or XML) to create the service guide menu 52 (FIG. 3), several features may be implemented by the service guide 39. For example, the language of the textual display of the service guide menu 52 may be defined by the system operator by including the following HTML syntax: <html lang="language-code">. The "language-code" variable allows the service guide to be presented in various languages depending on the language code parameter (i.e., English ("en"), French ("fr"), Spanish ("es")), etc.

The underlying link definition, or syntax, that comprises the selectable link labels 56 (FIG. 3) corresponding to the services provided by the DHCT 16 includes identification of the particular services, so that when one of the link labels 56 is selected by the user, the service guide 39 knows which service to activate. The underlying link definition may, for example, include in the reference a short description of the service. Consequently, the syntax, <A HREF="tv://service/ short_description">, would reference the target service and the application that provides the service according to the short description assigned or corresponding to the target service. Similarly, the SAM service ID or the actual channel assigned to a desired service may also be used to activate a service. The syntax <A HREF="tv://service/decimal_id">, where the "decimal_id" is "10," identifies the SAM service with the service ID that is 10. Additionally, the syntax, <A HREF="tv://channel/display_channel_number">, where "display_channel_number" is equal to "3," activates the service on the receiver's channel 3.

Examples of services that can be included in the service guide menu 52 include, but are not limited to, those provided by the following applications: watching TV, listening to digital music, impulse pay-per-view, interactive program guide, DHCT settings, E-mail, video-on-demand, games-on-demand, videophone and/or conferencing, ticker tape data services, web browser, home banking, billing, calendar, calculator, context-sensitive help applications that display help text depending on the current channel service, downloading digital music into an MP3 device attached to the DHCT, uploading images from a digital camera attached to the DHCT, e-commerce, etc. In the preferred embodiment, any service available to the user in the cable system 10 can be accessed via the service guide menu 52, as configured by the system operator and/or in the respective alternate embodiments as configured by the user to reflect a user's own customization and preferences.

As discussed above, graphical icons and text representing the services can be included as part of the selectable link labels 56, as shown in 56a, 56b, and 56c. For example, the HTML link definition syntax <A HREF="tv://service/ipg"><IMG SRC="bfs://images/ipg_icon.jpg">What's On</A> would be used to create the selectable link representation in 56a. This embodiment is shown in FIG. 3.

Figure 5:
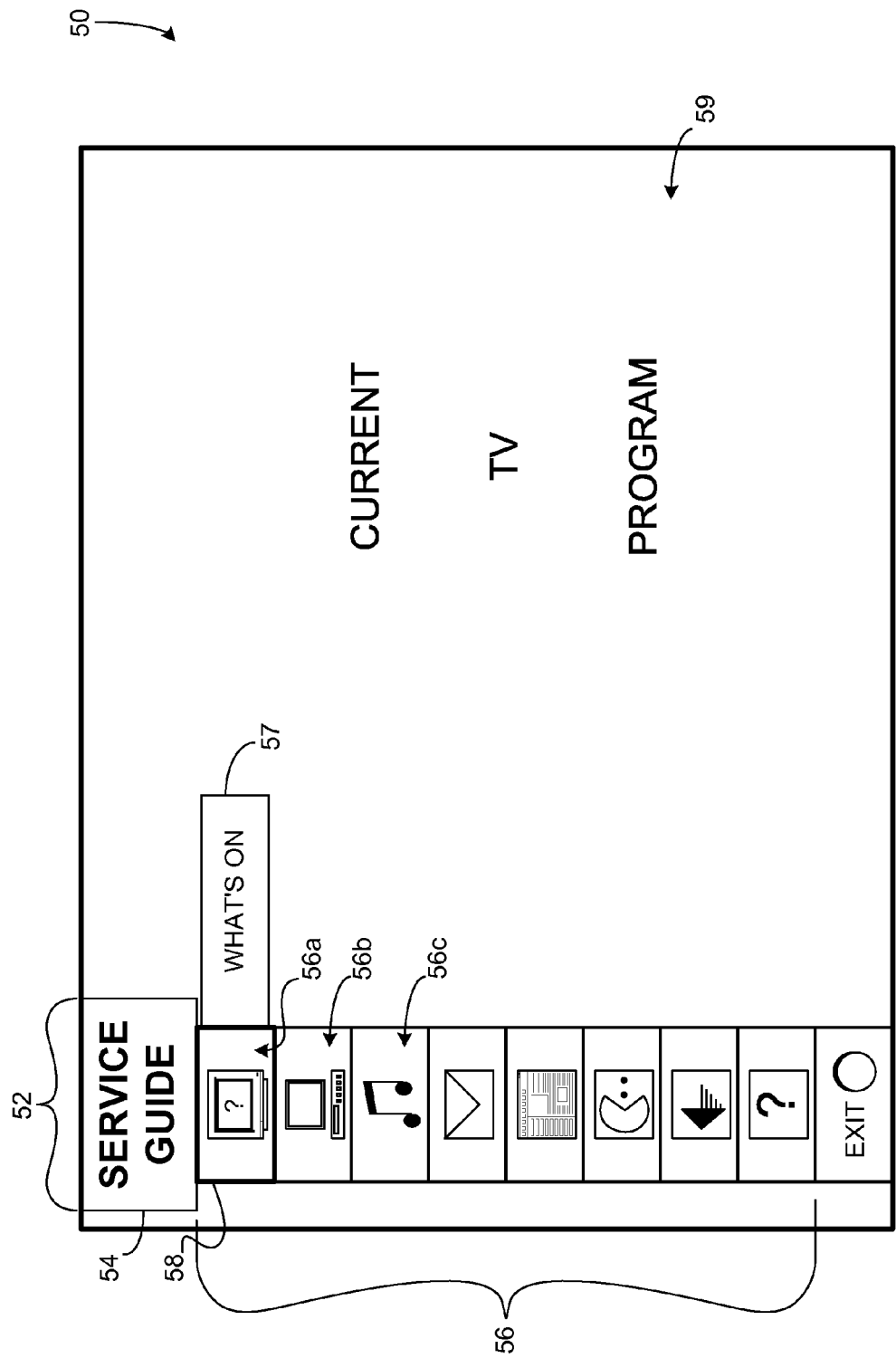
FIG. 5 is a diagram of the service guide presented to the user by the DHCT in FIG. 2 depicting selectable link representations with additional information banners viewable by the user upon moving the cursor to a particular selectable link representation.

An alternative embodiment enables additional information about the selectable link labels to be incorporated in the link definition itself by specifying a title for the information to be displayed. As a non-limiting example, the link definition <A HREF="tv://service/wnbc" TITLE="information about the link"><IMG SRC="tv://service/logo/215"></A> instructs the service guide 39 that additional information exists for this service and may be presented to the user in a variety of formats depending on the layout of the service guide menu 52. The "TITLE" attribute describes the object specified with the HREF attribute. If the service guide menu 52 is arranged in a horizontal toolbar format at the bottom of the screen (see FIG. 9), the information referenced by the "TITLE" attribute is displayed in a fixed location immediately above or below the row of buttons. Finally, if the service guide menu 52 is arranged in a vertical toolbar format at the left of the screen (as shown in FIG. 5), the "TITLE" information may appear in a window 57 to the right of each selectable link label 56 centered vertically with the link label 56.

If, as in one example, the title information for all selections is not already shown to the user upon initial presentation of the service guide menu 52, the information display about each selectable link label 56 may be accessed in several methods. As a non-limiting example, an information key on a remote device 27, such as the "INFO" key 72 (FIG. 6), may be configured to instruct the service guide application 39 to display the information corresponding to a selectable link label 56 as described above. As another non-limiting example, the service guide 39 may immediately present the information 57 (FIG. 5) about a selectable link label 56 after the user moves the cursor 58 on to the selectable link label 56 as described above. The presentation of the information 57 (FIG. 5) may be immediate or after a programmable timed delay set by the system operator to insure that the user is interested in the selectable link label 56 and not merely surfing between the plurality of selectable link labels 56. If the information is configured to display in a fixed portion of the screen display as described above, the service guide 39 may immediately present any available information referenced by the selectable link label 56 when the cursor 58 moves to a new selectable link label 56.

The underlying link definition for the selectable HTML link label 56 may additionally include information regarding activation of the target service in a specified screen state and location. As a non-limiting example, the selectable link definition <A HREF="tv://channel/32">NBC</A> uses the full screen in tuning to the channel that is assigned to the target service. Upon selection of the link label 56, for example, though not shown, corresponding to the link definition <A HREF="tv://channel/13">ABC</A> from the service guide 52 (FIG. 3), the service assigned to channel 13 is displayed in the full screen, and the service guide 52 and current TV program 59 are removed from view. As an additional non-limiting example, the link definition <A HREF="tv://service/email">E-mail</A> when activated causes the E-mail service to overlay on top of the current TV program 59 in full screen mode.

Some applications may be configured so that they are presented to the user in only a portion and/or relative spatial position of the display while another service or application is presented to the user in another location of the display 21. For example, a selectable link definition such as <A HREF="tv://service/email;env=fullScreenObstructed (location)">E-mail<A> (where location is a set of xmin, ymin, xmax, ymax coordinates) indicates to the service guide 39 that the E-mail service is to be activated in full screen obstructed mode and that the current TV program 59 is to be shown in a reduced location. A user is able to utilize the E-mail service while the DHCT 16 presents a current TV program 59 in a reduced screen portion of the display. Similarly, the selectable link label 56 in the service guide 52 may also specify activation of the target service in a reduced portion of the screen while retaining the current TV program 59 in the remaining portion of the display. For instance, a sport ticker tape may be designated to be displayed in the bottom of the TV display while a stock ticker tape may be designated to be displayed on the top. Thus, as a non-limiting example, the selectable link definition <A HREF="tv://service/stocks;env=reducedScreen(location)">Stock Ticker</A> instructs the service guide 39 (FIG. 2) to activate the stock ticker service with the stock ticker application's screen reduced to a specified portion of the screen as indicated by the "location" coordinates. The service guide 39 instructs the SAM 37 to activate the ticker application overlaid on the current TV program 59 (or any existing service on the current channel) when the user chooses this link label 56 from the service guide menu 52 (FIG. 3). In this manner, the target services may be activated in accordance to the selectable link labels 56 in the service guide menu 52 as configured by the system operator at the headend 11 of the network 20.

As discussed above, it is possible for the service guide menu 52 to include a link label 56 to a specific channel number accessible by the user. For example, the link definition <A HREF="tv://channel/13">ABC</A> can be included in the service guide content. When selected by the user, the service guide instructs the navigator to tune the DHCT to channel 3, thereby activating the service (i.e., ABC) defined for that channel.

The service guide menu 52 is additionally configurable to control the behavior and presence of the links based on the service authorization status of the DHCT 16. As a non-limiting example, the XML syntax <META UNAUTHORIZED="display_mode"> in the header of the service guide customized HTML file, sets the display format of the link according to the level of authorization for the user. Service authorization information is available to the service guide via the SAM API. If the "display_mode" is "activeIfAlternative," the link label 56 is selectable (shown active) even if the service is unauthorized as long as an alternate unauthorized service is available. Thus, the user may select the link label 56 to the target service, but the service guide 39 will activate the alternative service if the service specified in the service guide menu 52 is not authorized. Additional information regarding activation of alternative services to unauthorized services may be found in related U.S. patent application Ser. No. 09/542,484 filed Apr. 3, 2000, which is herein incorporated by reference in its entirety. If the "display_mode" is set to "inactive," links to services that are not authorized for the DHCT 16 are displayed to the user in a "grayed out" format so that the user may see the link label 56 but may not select the link label 56 for activation of the underlying target service. Alternatively, unauthorized services may not be displayed at all. Alternatively, unauthorized services are coalesced into a service category such as "Other Purchasable Services" or "Other Available Services."

Either the system operator of the cable television system or the user of the DHCT 16 may configure the display status of the link labels 56 with respect to authorization status of the target service. The system operator may designate the display status with respect to service authorization status for a link by a graphical user interface that graphically configures the service guide 39 XML/HTML code. The user, through a settings menu (not shown) may configure the service guide menu 52 so that the display mode of one or more selectable link labels 56 is "inactive" or "none" so the display of the selectable link label 56 conforms to the display modes described above.

The service guide menu 52 is additionally configurable to control the behavior and presence of the link labels 56 based on the parental control status of the DHCT as maintained by the navigator 35 application. As a non-limiting example, the syntax <META BLOCKED=display_mode"> in the header of the service guide customized HTML file directs the service guide 39 to set the display format of the link label 56 according to the level of parental control set by the user. Service parental control information is available to the service guide 39 via the navigator API. If the "display_mode" is "active," the link label 56 is selectable (shown active) even if the service is blocked. Thus, the user may select the link label 56 to the target service, but the service guide will display a pop-up barker (not shown) indicating that the service is not available because it has been blocked by parental control. If the "display_mode" is set to "inactive," links to services that are blocked by parental control are displayed to the user in a "grayed out" format so that the user may see the link label 56 but may not select the link label 56 for activation of the underlying target service. Finally, if the "display_mode" is set to "none," links to services that are blocked by parental control are not included in the service guide menu 52.

Either the system operator of the cable television system or the user of the DHCT 16 may configure the display status of link labels 56 with respect to parental control status of the target service. The system operator may designate the display status with respect to service blocking status by a graphical user interface that graphically configures the service guide 39 HTML (or XML) code. More likely, the user, through a settings menu (not shown), may configure the service guide menu 52 so that the display mode of one or more link labels 56 is "inactive" or "none" so the display of the selectable graphic 56 conforms to the display modes described above. Alternatively, the user can configure the service guide menu 52 by calling the automated phone menu system, logging on to a specified secure and encrypted web site, or navigating through a configuration application running in the user's DHCT 16 as described above.

The service guide 52 may allow configurability by the user so as to include one or more favorite links so designated by the user to appear in the service guide menu 52. While the system operator may configure one or more selectable link labels 56 to always be presented in the service guide menu 52, the system operator may configure the service guide menu 52 to display selectable link labels 56 to services chosen by the user for incorporation in the service guide menu 52. As a non-limiting example, the system operator can include the syntax <A HREF="tv://favorite/favorite_number"> whereby a user may choose to designate a frequently watched channel, such as ESPN, to appear on the service guide menu 52 through a settings display (not shown) so the user can quickly access the ESPN channel upon activating the service guide menu 52. The user may designate any channel or service as a favorite for inclusion in the service guide menu 52 for quick access. The user is limited to the number of favorite selectable link labels 56 as permitted by the system operator in configuring the service guide display, as specified in the "favorite_number" in the non-limiting example.

In an alternative embodiment, multiple favorite entries are allowed in the service guide menu 52 and the user is allowed to edit and rename the entry specifying a favorite set. Furthermore, any service included in a favorite set can appear in one or more favorite sets as the user desires.

In an alternative embodiment, selectable link labels 56 may be added to the service guide menu 52 by the service guide 39 itself for services most frequently activated by the user. The navigator 35 or other software in the DHCT 16 may be configured to tabulate the frequency of activation for services channels or applications and include one or more selectable link labels 56 for the most popular or frequently activated services. Thus, as a non-limiting example, the system operator can configure the service guide menu 52 to include one or more link labels 56 to frequently accessed services by specifying the syntax <A HREF="tv://frequent/frequent_num">. If a user frequently utilizes, for example, a Cyberdeli service (an interactive service supported by the DHCT 16, but not shown, for ordering delicatessen foods), the service guide 39 will include a selectable link label 56 referencing the Cyberdeli service in the service guide menu 52. Alternatively, the DHCT 16 may present the user the tabulated list of most frequently activated services for the user to choose which services to incorporate on the favorites list.

The display order and the number of most frequently activated services by the user may be programmed by the cable operator or alternatively configurable by the user during any of the user configuration sessions described above. In an alternate embodiment, the set of services most frequently activated by the user is displayed in the service guide menu 52 in chronological order from top to bottom. Alternatively, the displayed chronological order is from bottom to top. In yet another alternate embodiment, the finite set of services most frequently activated by the user is displayed in the service guide menu 52 in an order programmable as a function of both chronology and the amount of time of use of each service. For instance, a first service that was frequented fewer times than a second service within the past few days may be displayed with higher precedence in the display order or retained for a longer period of time in the set of most frequently activated services if the accumulated time usage of the first service is significantly higher than the second service over the same span of time.

The service guide menu 52 may be configured to additionally display a selectable link label 56 to services or channels in a time-specific manner. The service guide 39 may be configured to switch as time progresses from a first configurable service guide menu presentation to a second configurable service guide menu presentation according to a schedule that specifies the time interval when each of two or more respective service guide menu presentations is to be active. Two or more from a multiplicity of configurable service guide menu presentations are each configured to be active for one or more intervals of time in a recurring schedule. Only one configurable service guide menu is active at a time throughout the configurable recurring schedule but a first configurable service guide menu may be active throughout one or more distinct and non-overlapping time intervals of the configurable recurring schedule. The recurrence of the schedule is configured to one of a multiplicity of choices such as a weekly, daily, or a monthly recurring schedule.

In one embodiment, the system operator configures a multiplicity of time-adaptive service guide presentations for each of a multiplicity of recurring schedule choices. For instance, the system operator may configure six different arrangements to choose from for users that opt for a time-adaptive service guide on a daily recurring schedule. On the other hand, the system operator may configure more than six different arrangements to choose from for users that opt for a time-adaptive service guide on a weekly recurring schedule.

In another embodiment, in addition to having the choice of selecting one of a multiplicity of time-adaptive service guides pre-configured by the system operator, the user can additionally configure a time-adaptive service guide according to the user's preference for a user-selected recurring schedule from the set of recurring schedule choices. The user can enter the user's preferences through an interactive configuration session in the DHCT 16 or in alternate embodiments by calling the automated phone menu system or logging on to a specified secure and encrypted web site as described above.

In one embodiment, a time adaptive service guide 39 running a weekly recurring schedule may include selectable link labels 56 to, for example, news and financial programming for one or more specific time intervals (e.g., 7:30 to 8:00 A.M. and/or 11:00 to 11:30 PM for news; 1:00 to 5:00 PM for financial services) during weekdays. During weekends, the weekday selectable link labels 56 become inactive. Examples of selectable link labels for weekend days include sports programming (i.e., football on Sundays from 1:00 to 7:00 PM), videos-on-demand (i.e., Saturdays from 8:00 to 11:00 PM), or pizza delivery. This is accomplished by configuring the service guide server 48 to include different HTML files for each day, such that the service guide client 39 receives a different set of link labels 56 depending on the aforementioned time criteria.

Figure 6:
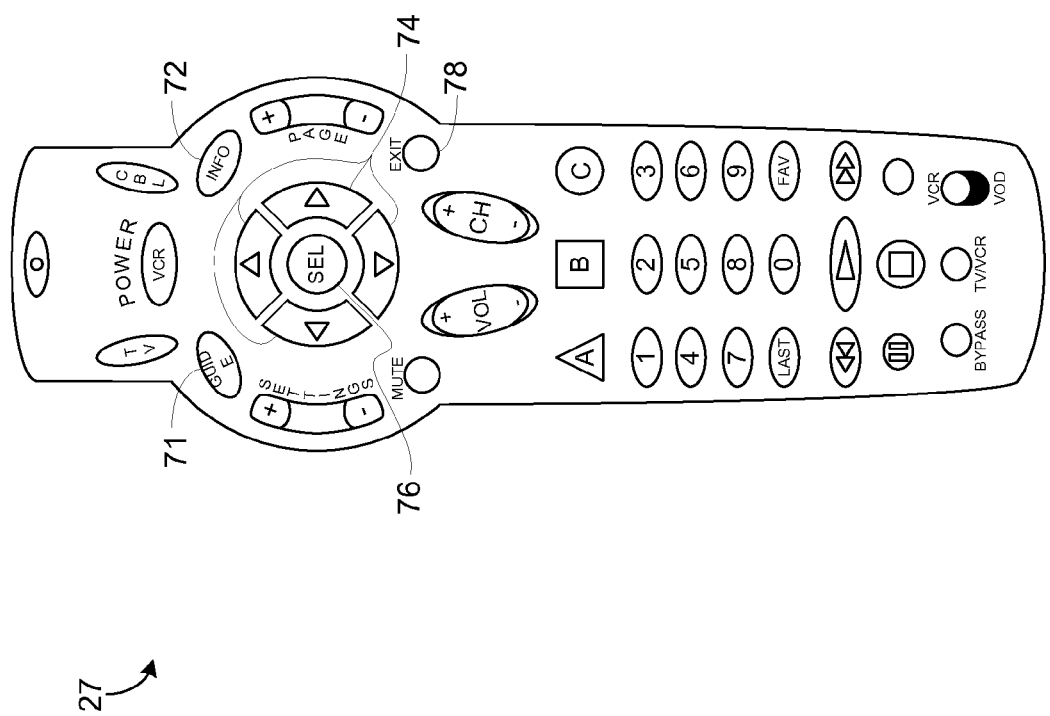
FIG. 6 is a diagram of a remote unit with a dedicated key to access the service guide depicted in FIG. 3.

A user may access the service guide menu 52 in several ways. FIG. 6 is a block diagram of a remote unit 27 with a dedicated key to access the service guide 39. The navigator 35 on the DHCT 16 may be configured to activate the service guide 39 to present the service guide menu 52 whenever the user presses the GUIDE key 71 on remote 27. The user may navigate the service guide menu 52 by pressing the arrow keys 74 to move the cursor 58 (FIG. 3) to the desired selectable link label 56 (FIG. 3) in the service guide menu 52. Once the user moves the cursor 58 to the desired target service or application, the user presses the SEL key 76 to select the selectable link label 56 corresponding to that target service. If the user desires to exit the service guide menu 52, the DHCT 16 may be configured to remove the service guide menu 61 and return to the current TV program 59 if the user presses the GUIDE key 71 a second time or the EXIT key 78. It should be clear to one of ordinary skill that virtually any key on the remote 27 may be configured to activate the service guide application 39. It should also be obvious that remote 27 could be any type of corded or wireless remote or keyboard or other input devices. Other input commands can be received as signals in DHCT 16 by alternate means of receiving input, including voice signals and signals received via a communication port in DHCT 16.

Figure 7:
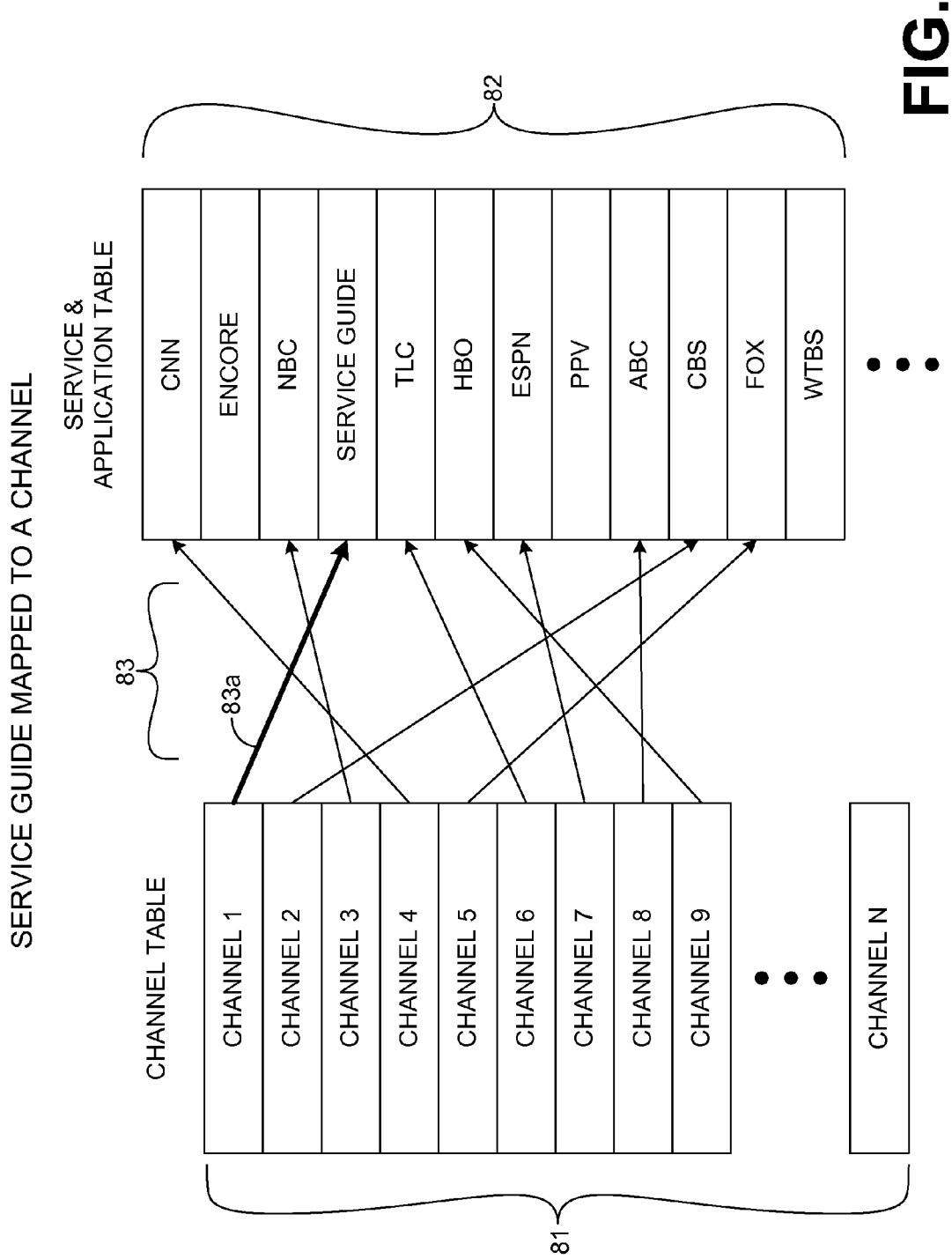
FIG. 7 is a diagram of the mappings of services to channels wherein the service guide in FIG. 3 is mapped to a channel of the channel table.

The service guide 39 may also be activated by the user upon entering a channel input corresponding to the service guide service 39, as defined by the system operator. FIG. 7 is a diagram of the mappings of services to channels wherein the service guide menu 52 in FIG. 3 is mapped to a channel of the channel table 81. The system operator at the headend 11 configures the assignment of services to channels. The channel table 81 is a list of all channels in the cable television system, and the service table 82 is a list of all available services or applications provided by the cable television system. The system operator configures the channel line-up by setting the various channels in channel table 81 to point 83 to the various service or application in the service table 82. A channel in the channel table 81 may point 83a to the service guide service, provided by the service guide application 39, so that the service guide menu 52 is displayed whenever the user selects that channel. Thus, in a non-limiting example, the service guide menu 52 is presented to the user upon the DHCT 16 receiving a command to display channel 1. Consequently, the service guide menu 52 is presented if the user inputs a channel 1 command or merely scrolls through the channels and stops on channel 1.

When the service guide service is assigned to a channel, the layout of the service guide covers the entire screen, similar to that shown in FIG. 9 and discussed below, without the current channel area. This is done by configuring the navigator 35 to activate the service guide with a SAM service resource environment of the full screen, and the service guide HTML content would be formatted for the entire 640×480 screen resolution of the DHCT.

Figure 8:
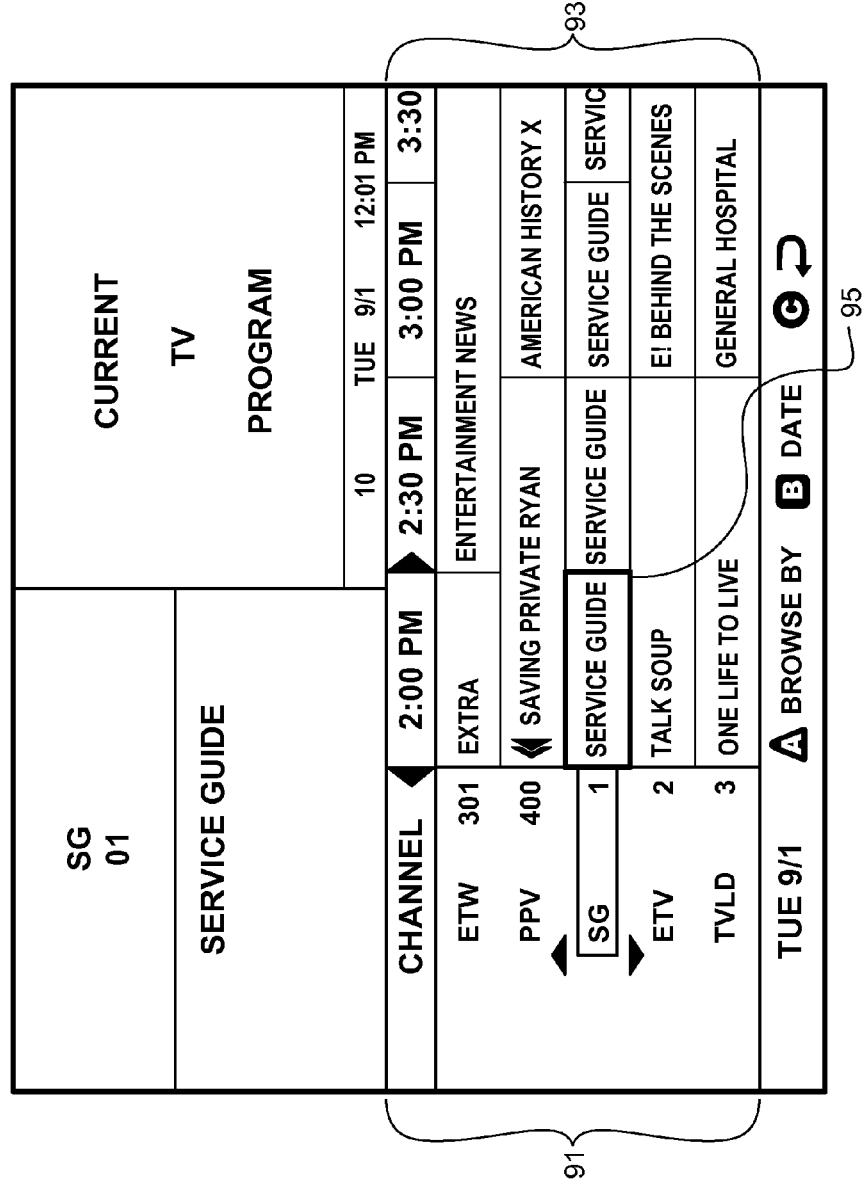
FIG. 8 is a diagram of an interactive program guide display that provides access to the service guide in FIG. 3.

FIG. 8 is a screen display diagram of an interactive program guide (IPG) display 90 that provides access to the service guide menu 52 in FIG. 3. The IPG display 90 presents current and future viewable programs to the user in a scrollable format based on channel and time. The user may navigate the IPG display 90 to select a current program for immediate viewing. The IPG display 90 is a vertically scrollable list of channel numbers in a channel portion of the display 91 and a horizontally and vertically scrollable program listing display 93 of program services corresponding to the respective channels in the channel portion of the display 91. The user navigates a cursor 95 in the program listing display 93 to select the individual program or service for activation. The service guide menu 52, as shown in FIG. 3, may be activated by the user in similar fashion by moving the cursor 95 to the service guide program listing in the program listing display 93. In this non-limiting example, the service guide 39 is listed in the channel portion of the display 91 as channel 1, and the service guide menu 52 is activated by moving the cursor 95 to the service guide listing in the program listing display 93 and selecting the service guide menu 52 with the remote 27.

Figure 9:
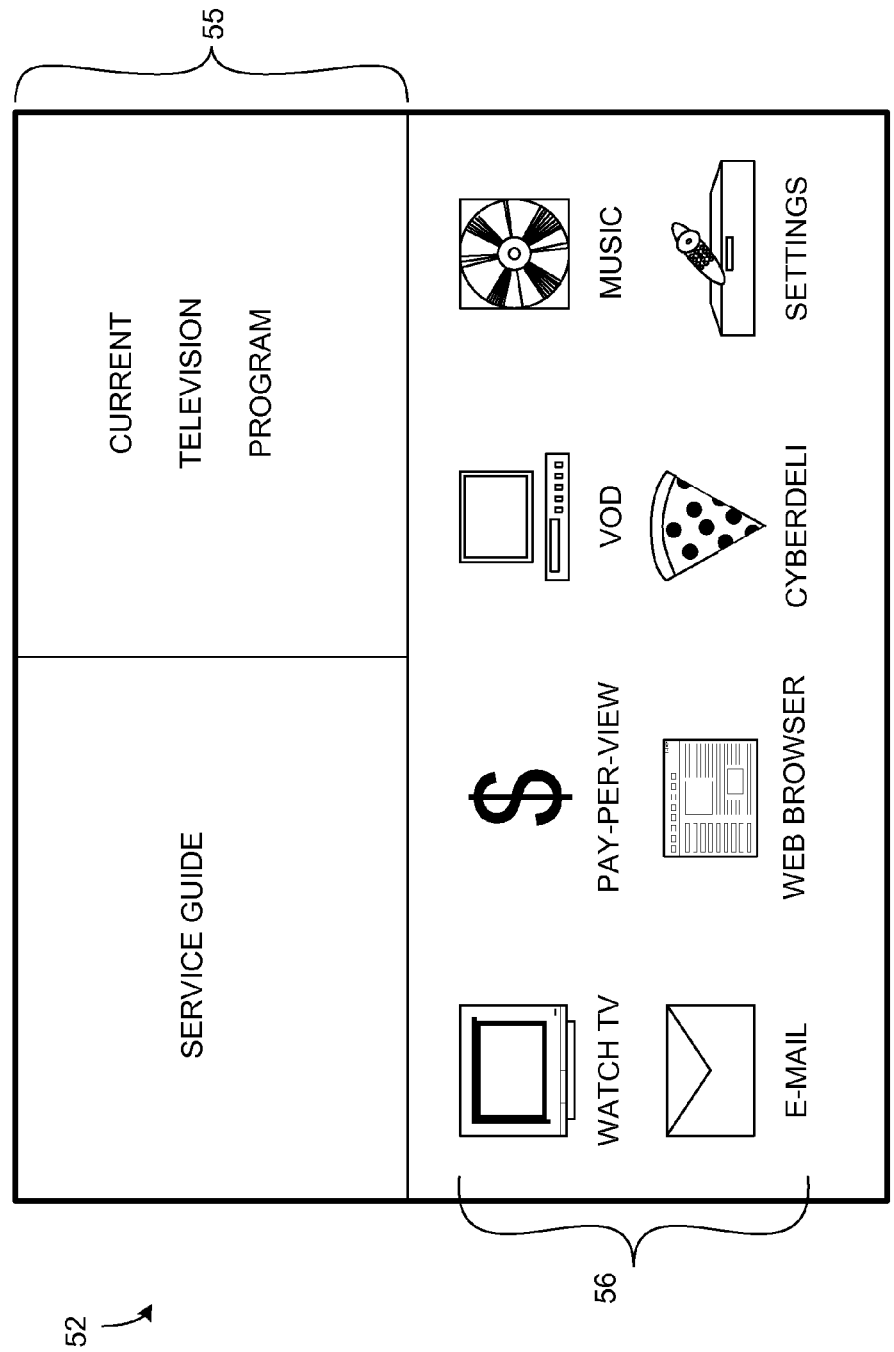
FIG. 9 is a diagram of the service guide in FIG. 3 displayed upon selection of the service guide menu from the interactive program guide of FIG. 8.

FIG. 9 is a screen display diagram of another example of the service guide menu 52 in a full screen format. Note that the selectable link labels 56 are arranged in horizontal format with the title information already displayed for each selectable link label 56. This is displayed upon selection of the service guide using a key on the remote as described previously. This is done by configuring the navigator 35 to activate the service guide 39 with a SAM service resource environment of the whole screen, and the service guide HTML content would be formatted for the entire 640×480 screen resolution of the DHCT. The current television program is displayed in ¼ screen section 55 by including an OBJECT with the SRC of "tv:" in the HTML content. The user may navigate the selectable link labels 56 of services 56 in the service guide menu 52 in similar fashion as described above.

An example of HTML code necessary to create the service guide 52 in full screen obstructed format as shown in FIG. 9 is as follows:

```
<html lang="en">
<TABLE BGCOLOR=color TEXT=color HBGCOLOR=color
HTEXT=color>
  <TR>
    <TD COLSPAN=2>
      <IMG SRC="logo.jpg">
    </TD>
    <TD COLSPAN=3>
      <OBJECT SRC="tv:">
    </TD>
  </TR>
  <TR>
    <TD>
      <A HREF="tv://channel/901" TITLE="WATCH TV">
        <IMG SRC="tv://service/logo/233">
      </A>
    </TD>
    <TD>
      <A HREF="tv://channel/1001" TITLE="PAY-PER-VIEW">
        <IMG SRC="tv://service/logo/278">
      </A>
    </TD>
    <TD>
      <A HREF="tv://service/501" TITLE="VOD">
        <IMG SRC="tv://service/logo/33">
      </A>
    </TD>
    <TD>
      <A HREF="tv://service/1400;env=fullScreenObstructed( )"
      TITLE="MUSIC">
        <IMG SRC="tv://service/logo/299">
      </A>
    </TD>
  </TR>
  <TR>
    <TD>
      <A HREF="tv://service/1201" TITLE="E-MAIL">
        <IMG SRC="tv://service/logo/304">
      </A>
    </TD>
    <TD>
      <A HREF="tv://service/1202" TITLE="WEB BROWSER">
        <IMG SRC="tv://service/logo/305">
      </A>
    </TD>
    <TD>
      <A HREF="tv://service/1203" TITLE="CYBERDELI">
        <IMG SRC="tv://service/logo/306">
      </A>
    </TD>
    <TD>
      <A HREF="tv://service/1204" TITLE="SETTINGS">
        <IMG SRC="tv://service/logo/307">
      </A>
    </TD>
  </TR>
</TABLE>
</html>
```

Alternatively, the <OBJECT src="tv"> tag could be removed, and the navigator 35 could be configured to activate the service guide service in the fullScreenObstructed mode. This would also cause the current channel to be displayed in the specified obstructed rectangle, rather than determining the location based on the location of the "tv:" OBJECT in the service guide HTML content.

Figure 10:
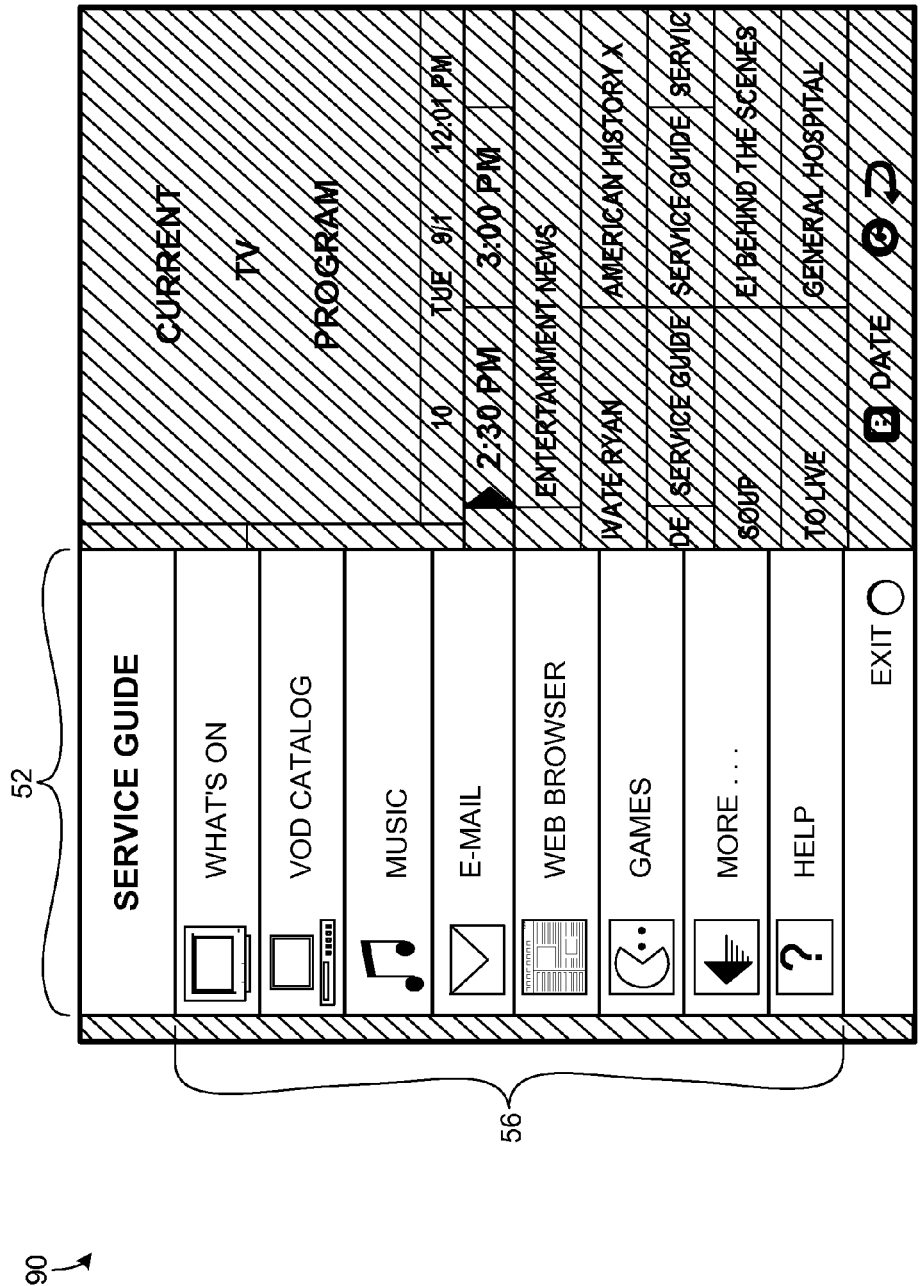
FIG. 10 is a diagram of an alternative embodiment service guide presentation for the user upon activating the service guide menu from the IPG display in FIG. 8.

FIG. 10 is a screen display diagram of an alternative embodiment service guide presentation 90 for the user upon activating the service guide menu 52 from the IPG display 90. In this alternative embodiment, the service guide menu 52 is overlaid on the IPG display 90 for the user to navigate the selectable link labels 56. The IPG display 90 is shown dimmed by hatching provide emphasis on the service guide menu 52, but the IPG display 90 could also be dimmed of discolored from its original display format signify its background position. The user may exit the service guide menu by depressing the Exit key 78 (FIG. 6) to return to the IPG display 90. This view is shown to depict that the service guide menu may be presented to the user in a variety of formats and may be accessed by the user by a variety of methods.

The service guide 39, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. Furthermore, any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The invention claimed is:

1. A method, comprising:
  presenting for display at a display device a first service guide menu and a second service guide menu both with a plurality of hypertext links ordered according to at least in part a received specification, wherein the ordering provides at least in part that television programming services are displayed as hypertext links in the first service guide menu and non-television services are displayed as hypertext links in the second service guide menu, wherein the second service guide menu is overlaid on the first service guide menu, the second service menu configured to be presented for repeated occurrences of a first recurring predetermined time period upon expiration of a second recurring predetermined time period associated with the first service menu wherein both the television programming services and the non-television programming services are available during the first and second recurring predetermined time periods, and wherein the hypertext links in the first service guide menu become inactive during the first recurring predetermined time period;

dimming the first service guide menu;

receiving a user selection of a hypertext link; and activating a service that corresponds to the selected hypertext link, wherein activating the service that corresponds to the selected hypertext link comprises utilizing additional information included in the selected hypertext link, wherein the additional information comprises a specified screen state and a service display location comprising a plurality of minimum and maximum coordinates.

2. The method of claim 1, wherein the ordering is based at least in part on a frequency of activation of a service.

3. The method of claim 1, wherein the ordering is based at least in part on usage by a user of a service.

4. The method of claim 1, wherein the ordering is based on an amount of time of use of a service.

5. The method of claim 1, wherein the dimming is performed by hatching the first service guide.

6. The method of claim 1, wherein the ordering is based on a combination of an amount of time of use of a service and a frequency of activation of the service.

7. The method of claim 1, further comprising the step of: displaying the first service guide menu upon expiration of a predetermined time period.

8. The method of claim 7, wherein the predetermined time period corresponds to a weekday time period.

9. The method of claim 7, wherein the predetermined time period corresponds to a recurring schedule.

10. A system, comprising:
a memory; and;
a processor capable of performing steps stored in the memory, the steps comprising:
presenting for display at a display device a first service guide menu and a second service guide menu both with a plurality of hypertext links ordered according to at least in part a received specification, wherein the ordering provides at least in part that television programming services are displayed as hypertext links in the first service guide menu and non-television service are displayed as hypertext links in the second service guide menu, wherein the second service guide menu is overlaid on the first service guide menu, the second service menu configured to be presented for repeated occurrences of a first recurring predetermined time period upon expiration of a second recurring predetermined time period associated with the first service menu wherein both the television programming services and the non-television programming services are available during the first and second recurring predetermined time periods, and wherein the hypertext links in the first service guide menu become inactive during the first recurring predetermined time period;

dimming the first service guide menu;

receiving a user selection of a hypertext link; and activating a service that corresponds to the selected hypertext link, wherein activating the service that corresponds to the selected hypertext link comprises utilizing additional information included in the selected hypertext link, wherein the additional information comprises a specified screen state and a service display location comprising a plurality of minimum and maximum coordinates.

11. A method comprising:
receiving a specification;
ordering a plurality of hypertext links based on the specification, wherein the ordering provides at least in part that television programming services are displayed as hypertext links in the first service guide menu and non-television services are displayed as hypertext links in the second service guide menu;

displaying the first service guide menu and the second service guide menu upon user request, wherein the second service guide menu is overlaid on the first service guide menu, the second service menu configured to be presented for repeated occurrences of a first recurring predetermined time period upon expiration of a second recurring predetermined time period associated with the first service menu wherein both the television programming services and the non-television programming services are available during the first and second recurring predetermined time periods, and wherein the hypertext links in the first service guide menu become inactive during the first recurring predetermined time period;

receiving a user selection of a hypertext link; and activating the service that corresponds to the selected hypertext link, wherein activating the service that corresponds to the selected hypertext link comprises utilizing additional information included in the selected hypertext link, wherein the additional information comprises a specified screen state and a service display location comprising a plurality of minimum and maximum coordinates.

12. The method of claim 11, wherein the non-television programming services comprise at least one of: an e-mail service, a video-on-demand service, and an e-commerce service.

13. The method of claim 11, further comprising: presenting information about the one of the first or second hypertext links upon a user request.

14. The method of claim 11, wherein, based on the specified screen state and the location, the selected service is displayed as an obstructed full screen on a display.

15. The method of claim 14, wherein the full screen is obstructed by a currently displayed television programming service which is displayed in a reduced screen portion of the display.

16. The method of claim 13, wherein the information is textual information including at least a title of a service associated with one of the first or second hypertext links.

* * * * *